(12) United States Patent
Kobayashi et al.

(10) Patent No.: US 10,699,569 B2
(45) Date of Patent: *Jun. 30, 2020

(54) INFORMATION PROCESSING APPARATUS, INFORMATION PROCESSING METHOD, AND PROGRAM

(71) Applicant: Sony Corporation, Tokyo (JP)

(72) Inventors: Yoshiyuki Kobayashi, Tokyo (JP); Kenta Kawamoto, Tokyo (JP); Naoki Ide, Tokyo (JP); Shingo Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,721

(22) Filed: Jul. 9, 2019

(65) Prior Publication Data

US 2019/0333380 A1 Oct. 31, 2019

Related U.S. Application Data

(63) Continuation of application No. 15/750,384, filed as application No. PCT/JP2016/067568 on Jun. 13, 2016, now Pat. No. 10,380,888.

(30) Foreign Application Priority Data

Sep. 18, 2015 (JP) ................................. 2015-185362

(51) Int. Cl.
*G08G 1/0965* (2006.01)
*G08G 1/00* (2006.01)
(Continued)

(52) U.S. Cl.
CPC ............. *G08G 1/0965* (2013.01); *G08G 1/00* (2013.01); *G08G 1/0112* (2013.01);
(Continued)

(58) Field of Classification Search
CPC ...... G08G 1/0965; G08G 1/00; G08G 1/0112; G08G 1/0129; G08G 1/04; G08G 1/09; G08G 1/0962
(Continued)

(56) References Cited

U.S. PATENT DOCUMENTS 7,639,841 B2 * 12/2009 Zhu ..................... G06K 9/00335
340/435
10,380,888 B2 * 8/2019 Kobayashi ........... G08G 1/0965
(Continued)

FOREIGN PATENT DOCUMENTS

JP 2001-34897 A 2/2001
JP 2006-293531 A 10/2006
(Continued)

OTHER PUBLICATIONS

International Search Report dated Aug. 30, 2016 in PCT/JP2016/067568 filed Jun. 13, 2016.
(Continued)

*Primary Examiner* — Kerri L McNally
(74) *Attorney, Agent, or Firm* — Xsensus LLP

(57) ABSTRACT

[Object] To provide an information processing apparatus, an information processing method, and a program capable of efficiently using information regarding a user evaluation of a target vehicle.
[Solution] An information processing apparatus including: a recognition section configured to automatically recognize information of a target vehicle from environment information of a user; an acquisition section configured to acquire a user evaluation of the recognized target vehicle; and a generation section configured to generate information for issuing a notification of the acquired user evaluation.

18 Claims, 32 Drawing Sheets

(51) Int. Cl.
  *G08G 1/09* (2006.01)
  *G08G 1/01* (2006.01)
  *G08G 1/04* (2006.01)
  *G08G 1/0962* (2006.01)
  *B60R 21/00* (2006.01)

(52) U.S. Cl.
  CPC ............ *G08G 1/0129* (2013.01); *G08G 1/04* (2013.01); *G08G 1/09* (2013.01); *G08G 1/0962* (2013.01); *B60R 21/00* (2013.01)

(58) Field of Classification Search
  USPC ........................................................ 340/902
  See application file for complete search history.

(56) References Cited

U.S. PATENT DOCUMENTS

| 2013/0144459 | A1* | 6/2013 | Ricci | G06F 13/364 |
| | | | | 701/1 |
| 2013/0191132 | A1 | 7/2013 | Tanaka | |
| 2014/0080098 | A1* | 3/2014 | Price | G09B 9/052 |
| | | | | 434/29 |
| 2014/0322676 | A1* | 10/2014 | Raman | G09B 19/167 |
| | | | | 434/65 |
| 2016/0039426 | A1* | 2/2016 | Ricci | H04W 4/21 |
| | | | | 701/1 |
| 2017/0076395 | A1* | 3/2017 | Sedlik | G08G 1/0112 |

FOREIGN PATENT DOCUMENTS

| JP | 2008-126954 A | 6/2008 |
| JP | 2012-150557 A | 8/2012 |
| JP | 2012-207941 A | 10/2012 |
| JP | 2012-252407 A | 12/2012 |
| JP | 2013-152524 A | 8/2013 |

OTHER PUBLICATIONS

Extended European Search Report dated Jul. 8, 2019, issued in corresponding European Patent Application No. 16846049.1.

* cited by examiner

FIG. 16

| ESTIMATION SUBJECT \ ESTIMATION OBJECT | VEHICLE 10A | VEHICLE 10B | VEHICLE 10C |
|---|---|---|---|
| VEHICLE 10D (OWN VEHICLE) | 90(±20)km/h | 85(±2)km/h | 90(±10)km/h |
| VEHICLE 10A | 95(±0)km/h | 84(±3)km/h | 93(±2)km/h |
| VEHICLE 10B | 96(±2)km/h | 86(±0)km/h | 94(±1)km/h |

| ESTIMATION SUBJECT \ ESTIMATION OBJECT | VEHICLE 10B | VEHICLE 10E (MOTORCYCLE) |
|---|---|---|
| VEHICLE 10A | ACCELERATION (RELIABILITY OF 40%) DECELERATION (RELIABILITY OF 60%) | [ESTIMATION IS IMPOSSIBLE] |
| VEHICLE 10B | DECELERATION (RELIABILITY OF 100%) | ACCELERATION (RELIABILITY OF 100%) |

INFORMATION PROCESSING APPARATUS, INFORMATION PROCESSING METHOD, AND PROGRAM

CROSS-REFERENCE TO RELATED APPLICATIONS

This application is a continuation of U.S. application Ser. No. 15/750,384, filed Feb. 5, 2018, which is based on PCT filing PCT/JP2016/067568, filed Jun. 13, 2016, and claims priority to JP 2015-185362, filed Sep. 18, 2015, the entire contents of each are incorporated herein by reference.

TECHNICAL FIELD

The present disclosure relates to an information processing apparatus, an information processing method, and a program.

BACKGROUND ART

As automobiles have been gaining widespread use and a large number of people have been using automobile on a daily basis, it has been at issue to clear up traffic congestion, prevent car accidents, improve driving manners, and the like.

For example, Patent Literature 1 below describes a system that acquires and transmits, to a server, behaviors (such as hazards or horns) of others against an own vehicle to evaluate the driving manners to increase the motivation to improve the driving manners, and calculates points according to driving evaluation information in the server.

In addition, in recent years, onboard information presentation apparatuses that present various kinds of information such as traffic congestion information and navigation information to a user have gained widespread use. For example, Patent Literature 2 below describes an onboard information presentation apparatus that displays the energy consumption state of an onboard battery of another vehicle on a map screen along with the current position of the other vehicle.

CITATION LIST

Patent Literature

Patent Literature 1: JP 2012-150557A
Patent Literature 2: JP 2012-207941A

DISCLOSURE OF INVENTION

Technical Problem

Here, in the technology described in Patent Literature 1 above, a user himself or herself is shown point information according to driving evaluation information of the user to be motivated to improve the driving manners. However, checking his or her own evaluation by himself or herself is insufficient to motivate the user to be a good driver. In addition, in the technology described in Patent Literature 2 above, it is possible to check the energy consumption state of an onboard battery of another vehicle, but an evaluation regarding the driving manners of another vehicle traveling in the surroundings is also important to prevent an accident or take a comfortable drive.

Accordingly, the present disclosure proposes an information processing apparatus, an information processing method, and a program capable of efficiently using information regarding a user evaluation of a target vehicle.

Solution to Problem

According to the present disclosure, there is proposed an information processing apparatus including: a recognition section configured to automatically recognize information of a target vehicle from environment information of a user; an acquisition section configured to acquire a user evaluation of the recognized target vehicle; and a generation section configured to generate information for issuing a notification of the acquired user evaluation.

According to the present disclosure, there is proposed an information processing method including, by a processor: automatically recognizing information of a target vehicle from environment information of a user; acquiring a user evaluation of the recognized target vehicle; and generating information for issuing a notification of the acquired user evaluation.

According to the present disclosure, there is proposed a program for causing a computer to function as: a recognition section configured to automatically recognize information of a target vehicle from environment information of a user; an acquisition section configured to acquire a user evaluation of the recognized target vehicle; and a generation section configured to generate information for issuing a notification of the acquired user evaluation.

Advantageous Effects of Invention

As described above, according to the present disclosure, it is possible to efficiently use information regarding a user evaluation of a target vehicle.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16 is a diagram illustrating a speed information list of a vehicle in a vicinity which is acquired by an own vehicle according to the second embodiment.

FIG. 30 is a diagram that describes a case where a driving situation of each user according to the sixth embodiment is automatically posted on an SNS or the like.

FIG. 31 is a diagram that describes the case where the driving situation of each user according to the sixth embodiment is automatically posted on the SNS or the like.

MODE(S) FOR CARRYING OUT THE INVENTION

Figure 1:
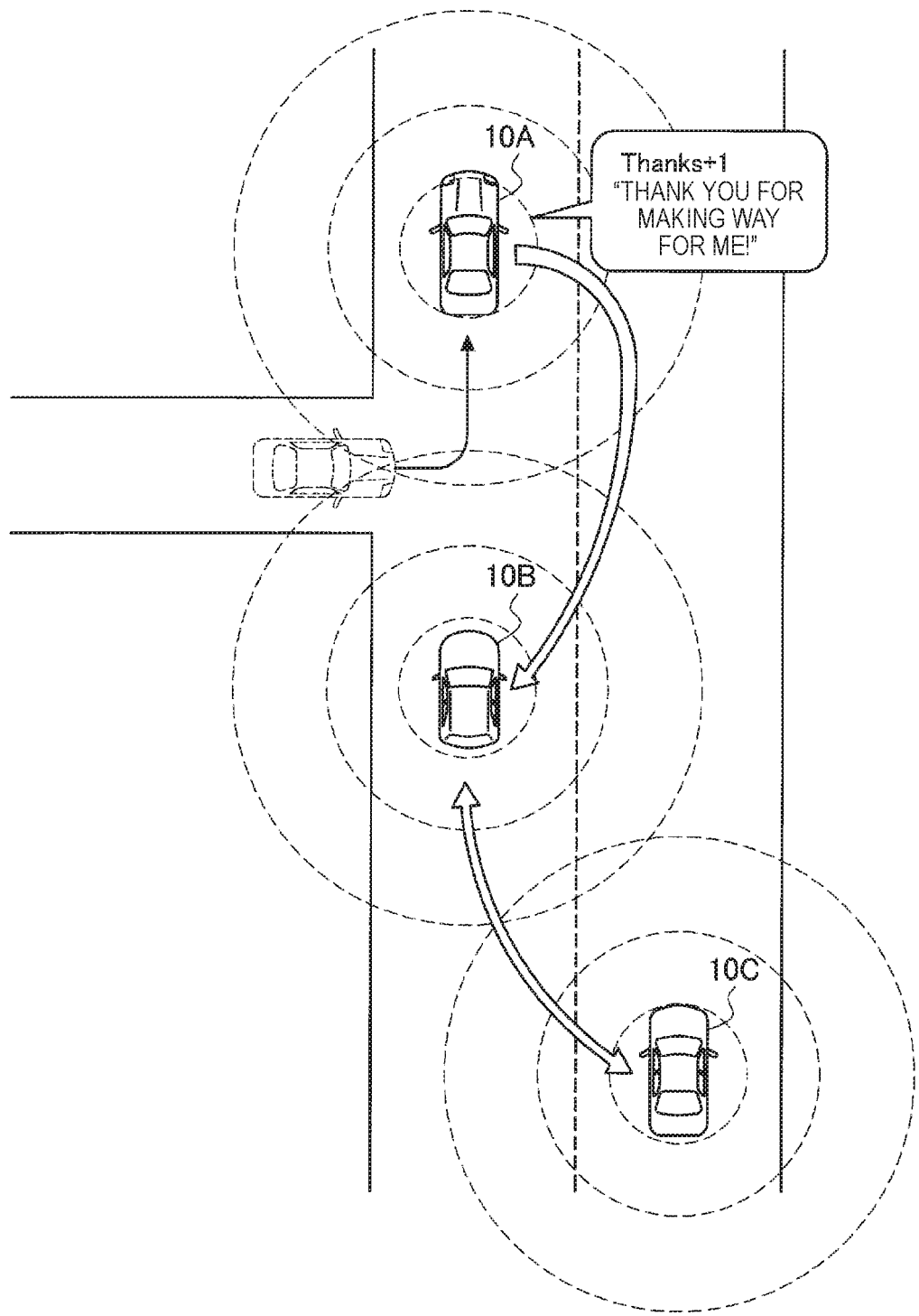
FIG. 1 is a diagram that describes an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.

1. Overview of Information Processing System according to Embodiment of the Present Disclosure
2. Configuration
2-1. Basic Configuration
2-2. Detailed Configuration
3. Respective Embodiments
3-1. First Embodiment
3-2. Second Embodiment
3-3. Third Embodiment
3-4. Fourth Embodiment
3-5. Fifth Embodiment
3-6. Sixth Embodiment
4. Supplemental Information
5. Hardware Configuration Example
5-1. Configuration Example of Vehicle Control System
5-2. Configuration Example of Information Processing Apparatus
5-3. Others
6. Conclusion

1. OVERVIEW OF INFORMATION PROCESSING SYSTEM ACCORDING TO EMBODIMENT OF THE PRESENT DISCLOSURE

An information processing system according to an embodiment of the present disclosure efficiently uses information regarding a user evaluation of a target vehicle, for example, to improve driving manners, prevent accidents, offer assistance in comfortable driving, and the like. FIG. 1 is a diagram that describes the overview of an information processing system according to an embodiment of the present disclosure. In the illustrated example, a vehicle 10A, a vehicle 10B, and a vehicle 10C have vehicle-to-vehicle communication functions that allow them to transmit and receive signals to and from another vehicle present in the vicinity.

Here, for example, in the case where the vehicle 10B makes way for the vehicle 10A when the vehicle 10A enters through traffic, it is mannerly for the vehicle 10A to express gratitude to the vehicle 10B to the extent to which the vehicle 10A is not disturbed (e.g., to the extent to which the driving is not disrupted). Normally, gratitude is expressed by raising a hand, making a little bow, blinking the hazard lamps once or twice, or the like. Such gratitude is expressed ad hoc, but such gratitude may be collected as an evaluation of a driver (or a vehicle) to cause the driver (or the vehicle) to maintain good driving. For example, the driver of the vehicle 10A that is given way pushes a "thanks" button provided to the steering wheel or the like, or says "thank you for making way for me!" to explicitly evaluate the vehicle 10B. The vehicle 10A acquires a user evaluation on the basis of the "thanks" button that is pushed down or user speech that is picked up, and transmits the user evaluation to the vehicle 10B recognized as a target vehicle through vehicle-to-vehicle communication. The vehicle 10B stores the received evaluation information or presents the received evaluation information with a display apparatus (augmented reality (AR) function of the display or windshield) that is visually recognizable to the driver to establish communication between the drivers. A message, for example, "you are thanked" or "thank you for making way for me!" is displayed on the display apparatus.

As described above, the evaluations of the vehicle 10B from other users which are transmitted and accumulated from the vehicles in the surroundings through vehicle-to-vehicle communication are also transmitted from the vehicle 10B to the vehicle 10C that is a third party. The vehicle 10C receives the evaluation information of the vehicle 10B traveling in the nearby area through vehicle-to-vehicle communication, and presents the evaluation information to the display apparatus in the vehicle. Therefore, the driver of the vehicle 10C is able to grasp whether or not the vehicle 10B has good driving manners from the evaluation information (e.g., numerical value indicating the number of times the vehicle 10B has been "thanked," most recent comments, or the like) of the vehicle 10B.

In this way, the evaluation information of each vehicle is also transmitted to vehicles in the surroundings, for example, to allow the driver of the vehicle 10C to recognize the preceding vehicle 10B as a dangerous vehicle having bad driving manners in the case where the number of times the vehicle 10B has been "thanked" is small, and the most recent comments show "suddenly cut in front of me" and "dangerous to weave the car!" This allows the driver of the vehicle 10C to prevent an accident and take a comfortable drive by avoiding driving behind the vehicle 10B or paying particular attention to the movement of the vehicle 10B.

In addition, criticism and gratitude of a vehicle are not used temporarily, but accumulated as evaluation information in association with the vehicle and released to vehicles in the surroundings, so that the motivation to maintain good driving is more sufficiently retained by making his or her driving evaluations known to the vehicles in the surroundings than by making his or hers open to only himself or herself Note that information of another vehicle that can be acquired from the other vehicle through vehicle-to-vehicle communication is not limited to the above-described evaluation information, but various kinds of information useful for preventing an accident, offering a comfortable drive, improving driving manners, and the like can be acquired.

Figure 28:
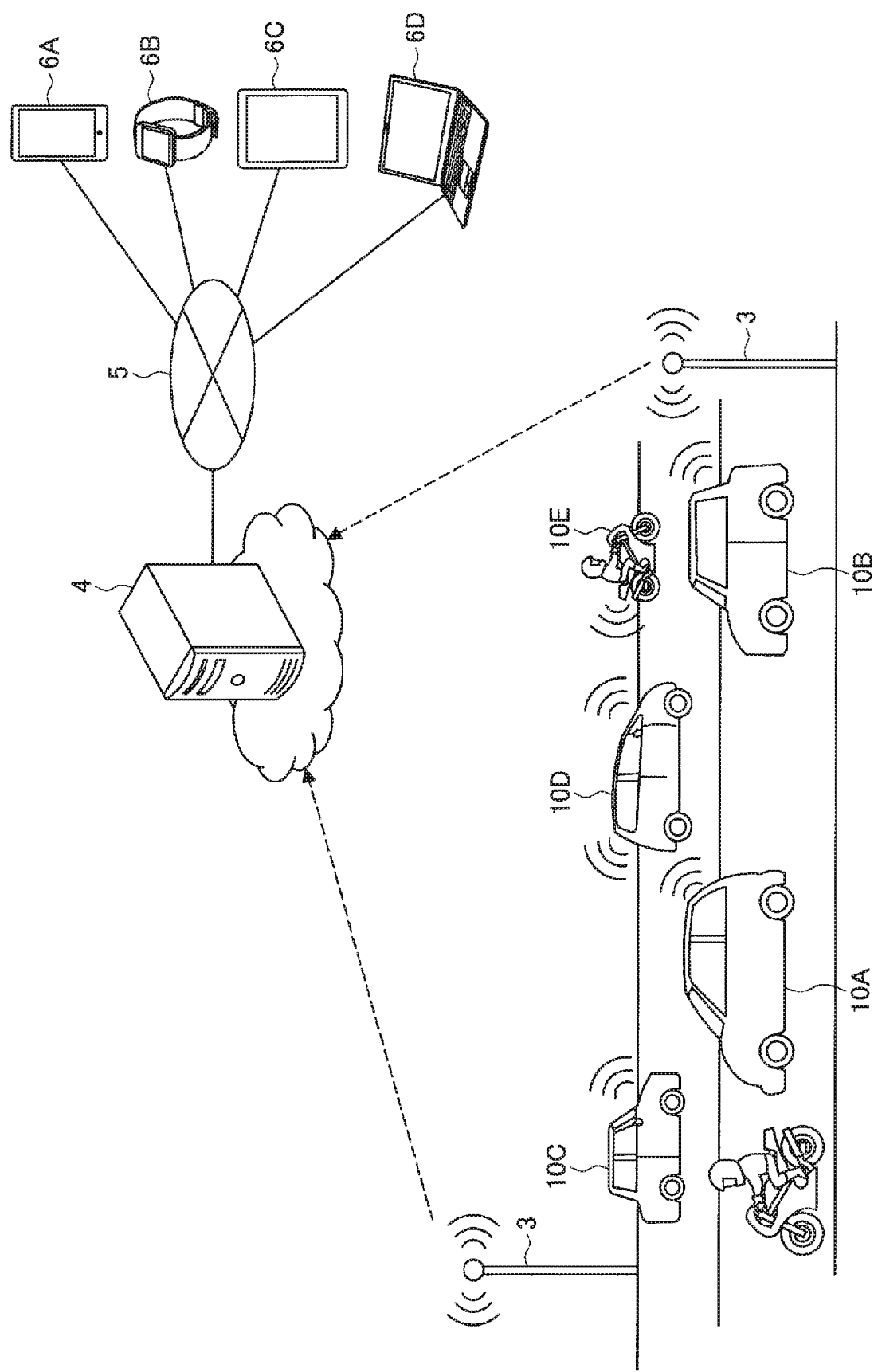
FIG. 28 is a diagram that describes an overall configuration of an information processing system according to a sixth embodiment.

In addition, information of another vehicle is not limited to an example in which information of another vehicle is communicated through vehicle-to-vehicle communication, but information of another vehicle may be acquired via a management server 4 (see FIG. 28). Each vehicle establishes a communication connection to a roadside wireless communication apparatus 3 (see FIG. 28) installed on a road through road-to-vehicle communication, and transmits and receives data to and from the management server 4 via the roadside wireless communication apparatus 3. Information of each vehicle is associated with vehicle-specific identification information (e.g., vehicle license number), and managed by the management server 4 along with current position information.

In addition, FIG. 1 illustrates automotive vehicles as the vehicle 10A, the vehicle 10B and the vehicle 10C, but the present embodiment is not limited thereto. The vehicle 10 may be a motorcycle or a mini-sized vehicle.

2. CONFIGURATION

Next, the configuration of an information processing apparatus 100 that implements the above-described information processing system will be described with reference to FIGS. 2 and 3. The information processing apparatus 100 can be mounted, for example, on a mobile object such as the vehicle 10A, 10B, or 10C. Alternatively, the information processing apparatus 100 can be mounted on a smartphone, a tablet terminal, a mobile phone terminal, a personal computer (PC), or the like that is carried into the vehicle 10.

2-1. Basic Configuration

Figure 2:
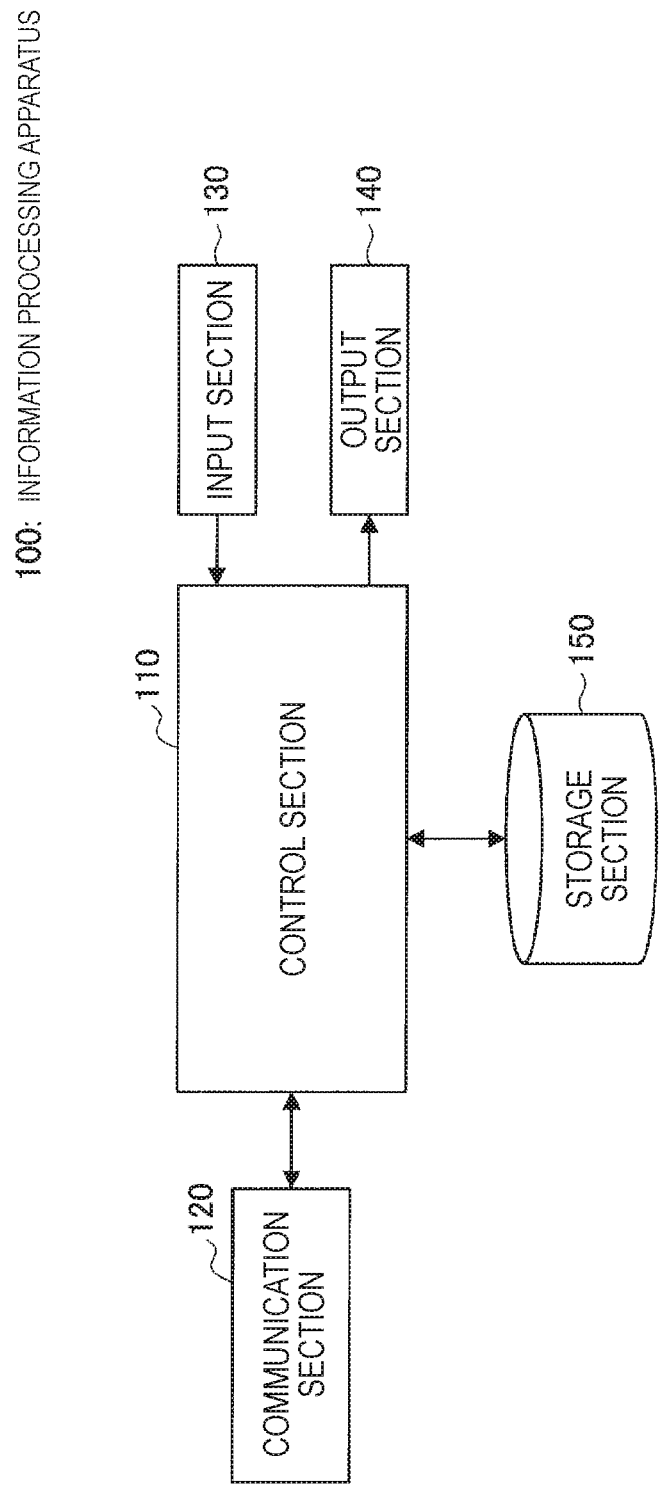
FIG. 2 is a diagram illustrating an example of a basic configuration of an information processing apparatus according to the present embodiment.

FIG. 2 is a diagram illustrating an example of the basic configuration of the information processing apparatus 100 according to the present embodiment. As illustrated in FIG. 2, the information processing apparatus 100 includes a control section 110, a communication section 120, an input section 130, an output section 140, and a storage section 150.

The control section 110 functions as an operation processing apparatus and a control apparatus, and controls the overall operation of the information processing apparatus 100 in accordance with a variety of programs. The control section 110 is implemented, for example, by an electronic circuit such as a central processing unit (CPU) and a microprocessor.

The communication section 120 is a communication module for transmitting and receiving data to and from another apparatus in a wired/wireless manner. For example, the communication section 120 communicates with another information processing apparatus 100 or the roadside wireless communication apparatus 3. In addition, the communication section 120 includes at least one of a communication module that performs vehicle-to-vehicle communication with another information processing apparatus 100 mounted on another vehicle traveling in the vicinity, a communication module that communicates with the roadside wireless communication apparatus 3 installed in the vicinity, a communication module that communicates with a mobile phone communication network, and a communication module that communicates with the Internet network.

The input section 130 receives an information input made from the outside to the information processing apparatus 100. For example, the input section 130 can be implemented by a touch panel, a switch, a button, a microphone, and each type of sensor.

The output section 140 outputs information by using video, an image, sound, vibration, or the like. For example, the output section 140 is implemented by a display apparatus (display or AR of windshield), speaker, or the like that is installed to be recognizable to the driver of the vehicle.

The control section 150 is implemented by a read only memory (ROM) that stores a program, an operation parameter and the like to be used for the processing of the control section 110, and a random access memory (RAM) that temporarily stores a parameter and the like varying as appropriate.

2-2. Detailed Configuration

Figure 3:
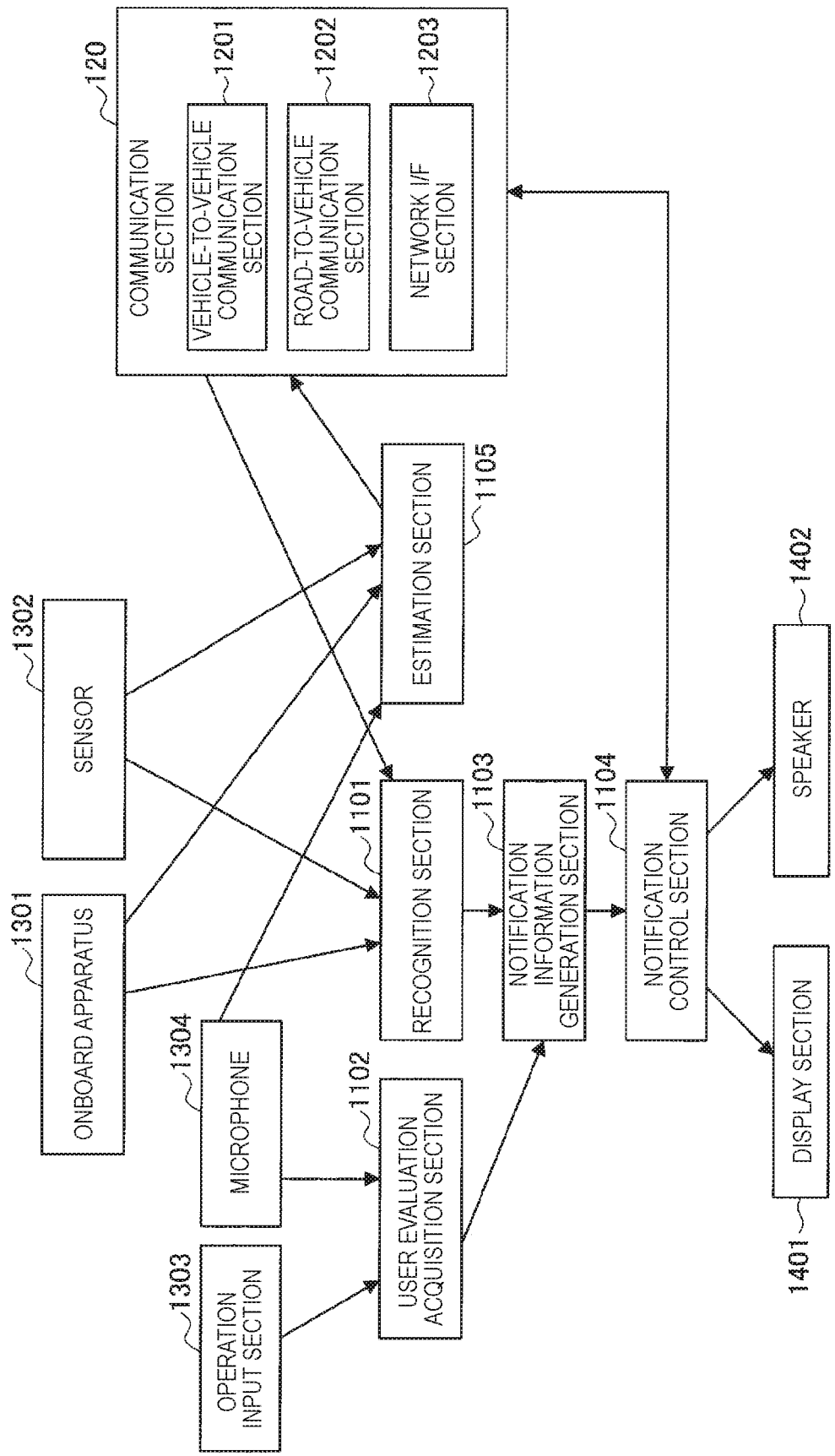
FIG. 3 is a diagram illustrating an example of a detailed configuration of the information processing apparatus according to the present embodiment.

FIG. 3 is a diagram illustrating an example of the detailed configuration of the information processing apparatus 100 according to the present embodiment. As illustrated in FIG. 3, the information processing apparatus 100 includes an onboard apparatus 1301, a sensor 1302, an operation input section 1303, a microphone 1304, a vehicle-to-vehicle communication section 1201, a road-to-vehicle communication section 1202, a network I/F (interface) section 1203, a recognition section 1101, a user evaluation acquisition section 1102, a notification information generation section 1103, a notification control section 1104, a estimation section 1105, a display section 1401, and a speaker 1402.

The onboard apparatus 1301, the sensor 1302, the operation input section 1303, and the microphone 1304 are examples of the input section 130. The onboard apparatus 1301 is an apparatus or a system provided to a vehicle, and, for example, a speedometer, a fuelometer, a navigation apparatus, a driver-assistance system such as a cruise controller or an automatic brake, a safety apparatus, and a self-driving system are assumed. Information acquired by the recognition section 1101 or the estimation section 1105 from the onboard apparatus 1301 includes, for example, information as shown below.

TABLE 1

| Onboard Apparatus | Information to Be Acquired |
|---|---|
| Vehicle | speed, steering wheel angle, remaining fuel, accelerator opening degree, brake step-on amount, gear, situation in which lights are turned on, state of direction indicator, number of passengers, situation in which seat belts are fastened, and the like |
| Navigation Apparatus | current position information (e.g., absolute position information by GPS or the like), destination, route to destination, time to destination, and the like |
| Safety Apparatus | presence or absence of safety apparatus, activation/deactivation situation (automatic tracking, automatic brake, lane keeping, lane deviation alert, and the like) setting situation of automatic brake (how many kilometers speed difference has, what kilometers is highest supported driving speed, activation condition, and the like) |
| Driver-assistance System | cruise control ON/OFF situation, set speed automatic tracking ON/OFF situation, tracking target car self-driving ON/OFF situation, various kinds of self-driving setting information |

The sensor 1302 senses various kinds of information regarding the inside of the vehicle or the area around the vehicle. For example, as the sensor 1302, a camera (image sensor), a depth sensor, a gaze sensor, a touch sensor, a vital sensor, an emotion sensor, and the like are assumed. Information acquired by the recognition section 1101 or the estimation section 1105 from the sensor 1302 includes, for example, information as shown below.

TABLE 2

| Sensor | Information to Be Acquired |
|---|---|
| Camera | identification information (license number, car type, color, and the like) of another car traffic regulation from traffic sign, state of traffic light, and the like |
| Depth Sensor | three-dimensional position, size, and moving direction of another car obstruction in surroundings and position thereof |
| Gaze Sensor | driver's gaze |
| Touch Sensor | driver's operation intention (e.g., intention to change lanes/turn right/turn left in case where hand touches turn signal switch) |
| Vital Sensor | driver's biological information (pulse, perspiration amount, body temperature, and the like) |
| Emotion Sensor | driver's emotion information (emotion predicted from vital sensor or driving content, and examples include mild-active, positive-negative, and the like) |

The operation input section 1303 detects operation input information made by a user. For example, the operation input section 1303 is implemented by a touch panel, a switch, a button, or the like. In addition, the operation input section 1303 includes a steering wheel, a lever switch, or a "thanks" button (example of an evaluation button) provided around the steering. Examples of information acquired by the user evaluation acquisition section 1102 from the operation input section 1303 include pushing-down information (example of information regarding an evaluation made by a user for another vehicle) of the "thanks" button.

The microphone 1304 picks up speech of a user. Examples of information acquired by the user evaluation acquisition section 1102 from the microphone 1304 include an evaluation comment made by a user to another vehicle like "thank you for making way for me." In addition, examples of information acquired by the estimation section 1105 from the microphone 1304 include an information request made by a user to another vehicle like "that car is weaving and looks dangerous . . . " or "I wonder where everybody comes from."

The onboard apparatus 1301, the sensor 1302, the operation input section 1303, or the microphone 1304 described above may be provided in the vehicle independently from the information processing apparatus 100.

The vehicle-to-vehicle communication section 1201, the road-to-vehicle communication section 1202, and the network I/F (interface) section 1203 are examples of the communication section 120. The vehicle-to-vehicle communication section 1201 and the road-to-vehicle communication section 1202 perform data communication between a vehicle and a vehicle, or a vehicle and a roadside wireless communication apparatus, for example, through near field communication such as Wi-Fi (registered trademark) or BlueTooth (registered trademark). In addition, the network I/F section 1203 performs data communication between a vehicle and a network through a mobile network of 4G (LTE; Long Term Evolution), 3G, or the like. Note that vehicle-to-vehicle communication section 1201 may perform data communication with another vehicle through visible light communication that uses the high-speed blinking pattern of headlights, position lamps, a turn signal, stop lamps, or the like.

The recognition section 1101, the user evaluation acquisition section 1102, the notification information generation section 1103, the notification control section 1104, and the estimation section 1105 are functional examples of the control section 110. The recognition section 1101 recognizes a target vehicle at which a user is gazing or a target vehicle when a user makes an evaluation. A target vehicle may be automatically recognized on the basis of information (i.e., user environment information) acquired by the recognition section 1101 from the onboard apparatus 1301, the sensor 1302, and the communication section 120. The user environment information is, for example, a driving situation of a user vehicle, gaze information of a user, a user's degree of concentration, speech contents of a user, surrounding information of a user, a positional relationship between a user vehicle and a vehicle in the surroundings, and the like. The recognition section 1101 is capable of automatically recognizing a target vehicle, for example, by comprehensively interpreting the acquired various kinds of information (user environment information) with machine learning. In addition, the recognition section 1101 may recognize a target vehicle in accordance with a user instruction input from the operation input section 1303, the microphone 1304, or the like.

Figure 4:
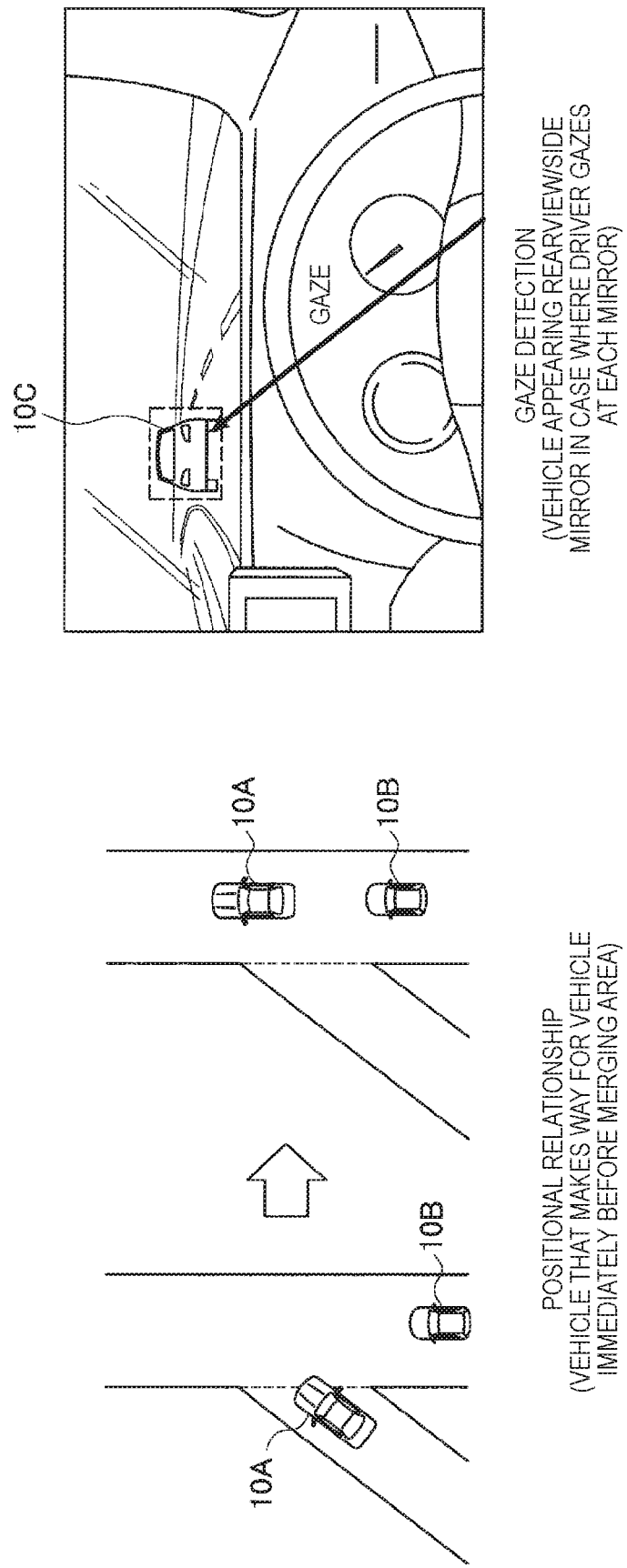
FIG. 4 is a diagram that describes an example of a method for recognizing a target vehicle according to the present embodiment.

Here, with reference to FIG. 4, an example of a method for recognizing a target vehicle will be described. FIG. 4 is a diagram that describes an example of a method for recognizing the target vehicle according to the present embodiment. As illustrated on the left side in FIG. 4, for example, in the case where, when the vehicle 10A enters through traffic, the vehicle 10B traveling in the through traffic makes way for the vehicle 10A immediately before the merging area, the information processing apparatus 100 mounted on the vehicle 10A recognizes, on the basis of the positional relationship between the vehicle 10A and the vehicle 10B, the vehicle 10B as a target vehicle at which the user gazes. The positional relationship between the vehicle 10A and the vehicle 10B is acquired, for example, on the basis of video acquired from a camera that is an example of the sensor 1302, distance information acquired from a stereo-camera, distance information acquired from an infrared sensor, or a signal acquired by the vehicle-to-vehicle communication section 1201 from the vehicle 10B. In addition, as illustrated on the right side in FIG. 4, the vehicle 10C at which a user is gazing may be recognized as a target vehicle on the basis of gaze information of the driver. The gaze information is acquired from a gaze sensor that is an example of the sensor 1302. The vehicle 10C present in the gaze direction indicated by the gaze information is recognized from video captured by a camera that is an example of the sensor 1302 and is provided to face the outside. In the case where a driver casts a gaze at a side mirror or the rearview mirror, the recognition section 1101 recognizes a vehicle appearing in the side mirror or the rearview mirror on the basis of a captured image obtained by imaging the mirror in accordance with the gaze of the driver. Note that the recognition section 1101 is capable of more accurately determining a target vehicle to which a driver pays attention by using not only the gaze information, but also the driver's degree of concentration which is acquired from a vital sensor that is an example of the sensor 1302.

In addition, the recognition section 1101 can also individually recognize the recognized target vehicle. Individual identification information (ID) of a target vehicle may be extracted from a signal received from the target vehicle via the vehicle-to-vehicle communication section 1201, or individual identification information may be acquired by inquiring a database on a network on the basis of the vehicle license number, the car type, and color information acquired according to image recognition. In addition, a vehicle that does not exist in the database may be newly recorded automatically on the database side.

The user evaluation acquisition section 1102 acquires information regarding a user's (here, driver's) evaluation of a target vehicle. Specifically, for example, the user evaluation acquisition section 1102 acquires information indicating that the "thanks" button which is an example of the operation input section 1303 is pushed down from the operation input section 1303 as user evaluation information. In addition, the user evaluation acquisition section 1102 analyzes speech sound of a user which is picked up by the microphone 1304, and acquires the user comment converted into text as user evaluation information.

On the basis of a user evaluation acquired by the user evaluation acquisition section 1102 and a target vehicle (vehicle which a driver gazes at and, here, is an evaluation target vehicle) recognized by the recognition section 1101, the notification information generation section 1103 generates information for issuing a notification of the user evaluation of the target vehicle. For example, the notification information generation section 1103 generates an evaluation display screen for displaying a user evaluation of a target vehicle. In addition, the notification information generation section 1103 is also capable of generating a reason for the user evaluation on the basis of at least any of information regarding the recognized target vehicle or environment information of a user. The generated reason for a user evaluation can be stored in the storage section 150 in association with the user evaluation, or transmitted from the communication section 120 to the target vehicle or a vehicle that is a third party.

The notification control section 1104 performs control such that a predetermined notification destination is notified of notification information generated by the notification information generation section 1103. For example, the notification control section 1104 performs control such that the vehicle-to-vehicle communication section 1201 transmits the generated notification information to a target vehicle. In addition, the notification control section 1104 may performs control such that the display section 1401 or the speaker 1402 notifies a driver of evaluation information of the own vehicle which is received by the vehicle-to-vehicle communication section 1201. In addition, the notification control section 1104 may performs control such that the display section 1401 or the speaker 1402 notifies a driver of evaluation information of the target vehicle which is received by the vehicle-to-vehicle communication section 1201. In addition, the transmission and reception of evaluation information are not limited to vehicle-to-vehicle communication. Evaluation information may be transmitted and received via the road-to-vehicle communication section 1202 or the network I/F section 1203. The evaluation information can include unique identification information of a target vehicle, an evaluation reason, or the like.

The estimation section 1105 estimates the type of information that a driver currently wants or what (e.g., type of) information a driver should be notified of. For example, on the basis of at least one of gaze information of a driver acquired from a gaze sensor, a driver's degree of concentration acquired from a vital sensor, a traveling situation acquired from the onboard apparatus 1301, a driving content, and a speech content of a driver acquired from the microphone 1304 (sound sensor), the estimation section 1105 uses machine learning for comprehensive interpretation and estimates what information is currently suitable for the driver. For example, when traveling on the freeway, the estimation section 1105 estimates that the driver wants to know the speed of another vehicle or only a dangerous vehicle. When entering an intersection in the city, the estimation section 1105 estimates that the driver wants to know a moving direction of another vehicle (go straight, turn right, or turn left), acceleration and deceleration information, and information of a blind spot. When parked, the estimation section 1105 estimates that the driver wants to know an evaluation of a vehicle in the surroundings, or the like. In addition, in the case where a driver says "that car is weaving somewhat . . . ," the estimation section 1105 estimates that the driver wants to know the danger degree of the target vehicle. In the case where the driver says "I wonder where everybody comes from," the estimation section 1105 estimates that the driver wants to know the address (prefecture information) of the driver of a vehicle in the surroundings. In addition, the estimation section 1105 may adjust the contents or amount of information that is presented to the driver, a presentation method, or the like in accordance with the driver's degree of concentration acquired by the vital sensor. For example, in the case where the driver's degree of concentration is low, the estimation section 1105 makes an adjustment such that more emergent information is presented to alert the driver. The estimation section 1105 estimates information that is currently suitable for the driver, and then makes a request of the estimated information to a predetermined request destination from the communication section 120. For example, in the case where the estimation section 1105 estimates that the speed of a vehicle in the surroundings, dangerous-vehicle information (danger degree of a vehicle in the surroundings), a moving direction (go straight, turn right, or turn left) of another vehicle, acceleration and deceleration information, information of a blind spot, evaluation information, or the like is information which is currently suitable, the estimation section 1105 uses the vehicle-to-vehicle communication section 1201 to acquire the corresponding information from the vehicle in the surroundings. Note that the dangerous-vehicle information (danger degree of a vehicle in the surroundings) may be extracted from evaluation information (i.e., vehicle that has a low evaluation and is evaluated as a vehicle having bad driving manners is regarded as a dangerous vehicle (having a high danger degree)). These kinds of information acquired by the communication section 120 are presented by the notification control section 1104 to the driver from the display section 1401 or the speaker 1402.

The display section 1401 and the speaker 1402 are examples of the output section 140. The display section 1401 is implemented, for example, by a display apparatus such as a liquid crystal display (LCD) apparatus or an organic light emitting diode (OLED) display apparatus. In addition, the display section 1401 may perform AV display on the windshield or a transmissive/semi-transmissive head-up display provided at a position that is within the driver's field of view and allows the driver to read the transmissive/semi-transmissive head-up display without distracting the gaze from the windshield. In addition, the display section 1401 may be implemented by a head-mounted display (HMD) worn on the driver, and AR display may be performed on the HMD. In the AR display, information is displayed in association with an actual vehicle.

The above describes the detailed configuration of the information processing apparatus 100 according to an embodiment of the present disclosure. Next, the above-described information processing system will be specifically described with a plurality of embodiments.

3. RESPECTIVE EMBODIMENTS

3-1. First Embodiment

First, with reference to FIGS. 5 to 10, an information processing system according to a first embodiment will be described. In the first embodiment, evaluation processing of another vehicle and the use of evaluation information accumulated in each vehicle will be described.

Figure 5:
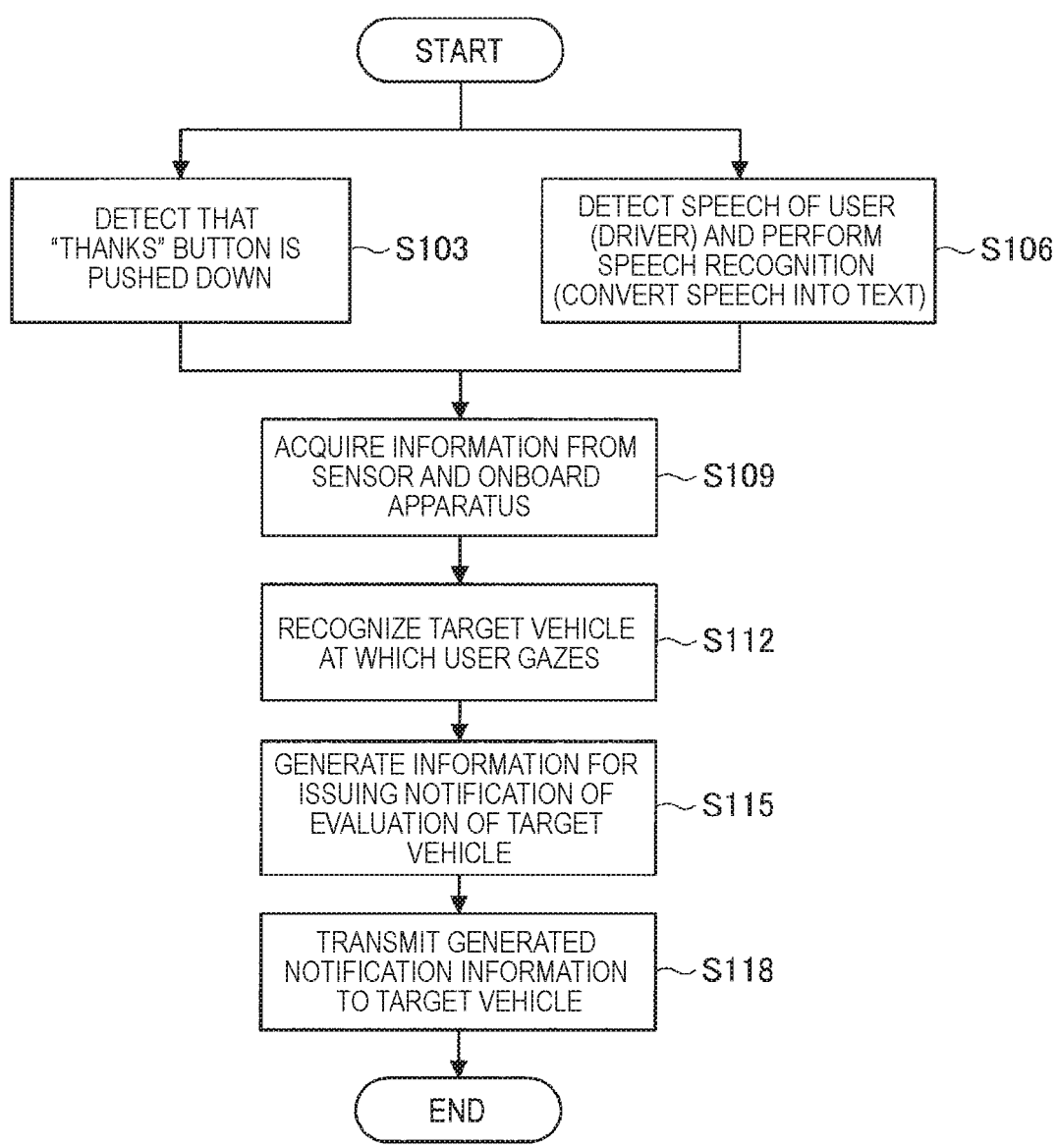
FIG. 5 is a flowchart illustrating evaluation input processing into another vehicle according to a first embodiment.

FIG. 5 is a flowchart illustrating evaluation input processing into another vehicle according to the first embodiment. As illustrated in FIG. 5, the user evaluation acquisition section 1102 of the information processing apparatus 100 first acquires the fact that a user (here, driver) has pushed down the "thanks" button, which is detected by the operation input section 1303, as user evaluation information (step S103).

In addition, the user evaluation acquisition section 1102 performs speech recognition speech of the driver (converts speech of the driver into text), which is picked up by the microphone 1304, and acquires it as user evaluation information (step S106).

Next, the recognition section 1101 of the information processing apparatus 100 acquires information used to recognize an evaluation target vehicle from the sensor 1302 and the onboard apparatus 1301 (step S109). For example, the recognition section 1101 acquires gaze information of the driver from the gaze sensor, a captured image obtained by imaging a vehicle in the surroundings from the camera, positional relationship information with a vehicle in the surroundings, a driving situation of the vehicle, and the like.

Next, the recognition section 1101 recognizes a vehicle (i.e., vehicle that is a user evaluation target) at which the driver gazes on the basis of the acquired information (step S112). For example, in the case where, when the user vehicle enters through traffic, the "thanks" button is pushed down or the driver says "thank you," the recognition section 1101 recognizes, on the basis of positional relationship information or a captured image, the other vehicle (another vehicle that makes way for the user vehicle when the user vehicle enters the through traffic) traveling behind the user vehicle when the user vehicle enters the through traffic as an evaluation target vehicle. In addition, in the case where the user vehicle slams on the brakes and says "watch out!" the recognition section 1101 recognizes, on the basis of gaze information or a captured image, another vehicle appearing (cutting in line) in front of the user vehicle as an evaluation target vehicle. In addition, the recognition section 1101 may acquire individual identification information of the target vehicle. The individual identification information of the target vehicle may be acquired, on the basis of information such as the license number, car type, or color of the target vehicle, which is acquired by analyzing a captured image, from the management server 4 on a network, or from the target vehicle through vehicle-to-vehicle communication.

Next, on the basis of a user evaluation acquired by the user evaluation acquisition section 1102 and information of a target vehicle recognized by the recognition section 1101, the notification information generation section 1103 generates information for issuing a notification of the user evaluation of the target vehicle (step S115). The information may include the individual identification information of the target vehicle.

Next, the notification control section 1104 performs control such that the generated notification information is transmitted to the recognized vehicle via the vehicle-to-vehicle communication section 1201 (step S118). In addition, the notification control section 1104 may transmit the generated notification information to the management server 4 on the network via the network I/F section 1203. In addition, the notification control section 1104 may notify a user (driver of the user vehicle) from the display section 1401 or the speaker 1402 that a user evaluation of the target vehicle is made. A notification of such notification information may be issued in real time when an evaluation is made.

Figure 6:
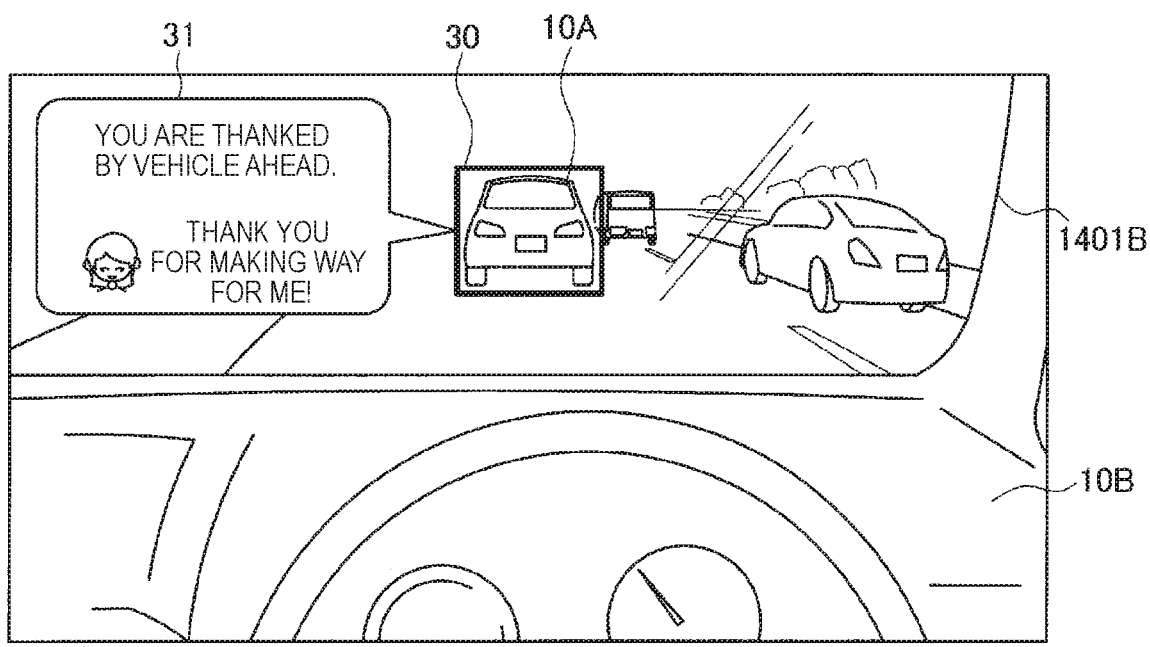
FIG. 6 is a diagram that describes a display example in which a notification of a user evaluation is issued in a target vehicle according to the first embodiment.

The driver of the target vehicle is notified of the notification information transmitted to the target vehicle. FIG. 6 is a diagram that describes a display example in which a notification of a user evaluation is issued in a target vehicle. Here, for example, as illustrated in FIG. 1, the case where the driver of the vehicle 10A evaluates the vehicle 10B that makes way for the vehicle 10A when the vehicle 10A enters through traffic, notification information for issuing a notification of the evaluation is transmitted from the vehicle 10A to the vehicle 10B, and AR display is performed on the windshield will be described. As illustrated in FIG. 6, AR display is performed on a frame image 30 displayed to surround the vehicle 10A such that the vehicle which makes an evaluation is identified, and an evaluation information image 31 for displaying evaluation information such as indicating that the "thanks" button is pushed down or displaying a comment from the vehicle 10A on a windshield 1401B of the vehicle 10B. Note that, although not illustrated in FIG. 6, not only a user evaluation, but also a reason (evaluation reason) for the user evaluation may be displayed.

The above describes the evaluation input processing according to the present embodiment which is performed for another vehicle. Note that the evaluation input processing according to the present embodiment is not limited to the flowchart illustrated in FIG. 5, but, for example, the information processing apparatus 100 may perform control to issue a notification that prompts a user to make an evaluation. More specifically, for example, in the case where the recognition section 1101 determines "the vehicle makes way for a user," the information processing apparatus 100 uses the notification information generation section 1103 to generate, for the user, notification information that asks "do you "thank" the vehicle that makes way for you?" The information processing apparatus 100 then uses the notification control section 1104 to notify the user of the generated notification information from the display section 1401 or the speaker 1402, and proposes a plus evaluation. In addition, in the case where the recognition section 1101 determines "dangerous cutting in front of the user," the information processing apparatus 100 makes a minus evaluation or generates notification information for proposing a minus evaluation, and notifies the user. Next, the case where evaluation information of a vehicle traveling in the vicinity is displayed will be described with reference to FIGS. 7 and 8.

Figure 7:
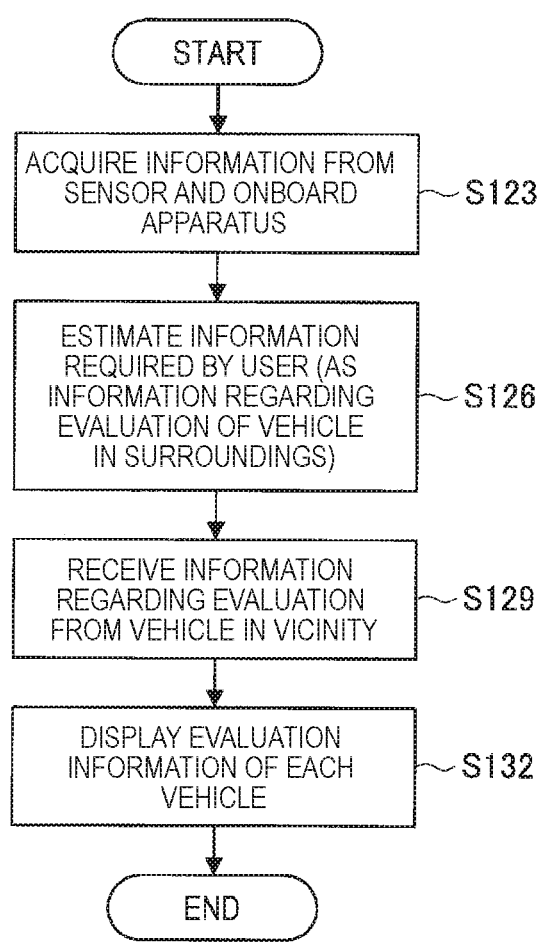
FIG. 7 is a flowchart illustrating display processing of evaluation information of the other vehicle according to the first embodiment.

FIG. 7 is a flowchart illustrating display processing of evaluation information of another vehicle. As illustrated in FIG. 7, the estimation section 1105 of the information processing apparatus 100 first acquires information for estimating information required by the user (here, driver) from the sensor 1302 and the onboard apparatus 1301 (step S123). For example, the estimation section 1105 acquires gaze information and a captured image from the sensor 1302, the current position from the onboard apparatus 1301, a driving situation, and the like.

Next, the estimation section 1105 estimates, on the basis of the acquired information, information that is currently required by the driver (or information that is currently suitable for the driver) (step S126). In the present embodiment, for example, in the case where the user vehicle travels goes straight in the city and the driver gazes at a vehicle in the surroundings, it is estimated that the driver currently wants to know evaluation information of the vehicle in the surroundings or the evaluation information of the vehicle in the surroundings is currently suitable.

Next, the vehicle-to-vehicle communication section 1201 acquires information regarding an evaluation from the vehicle in the vicinity in accordance with an estimation result of the estimation section 1105 (step S129). Specifically, evaluation information from another user which is accumulated in each vehicle is acquired.

Figure 8:
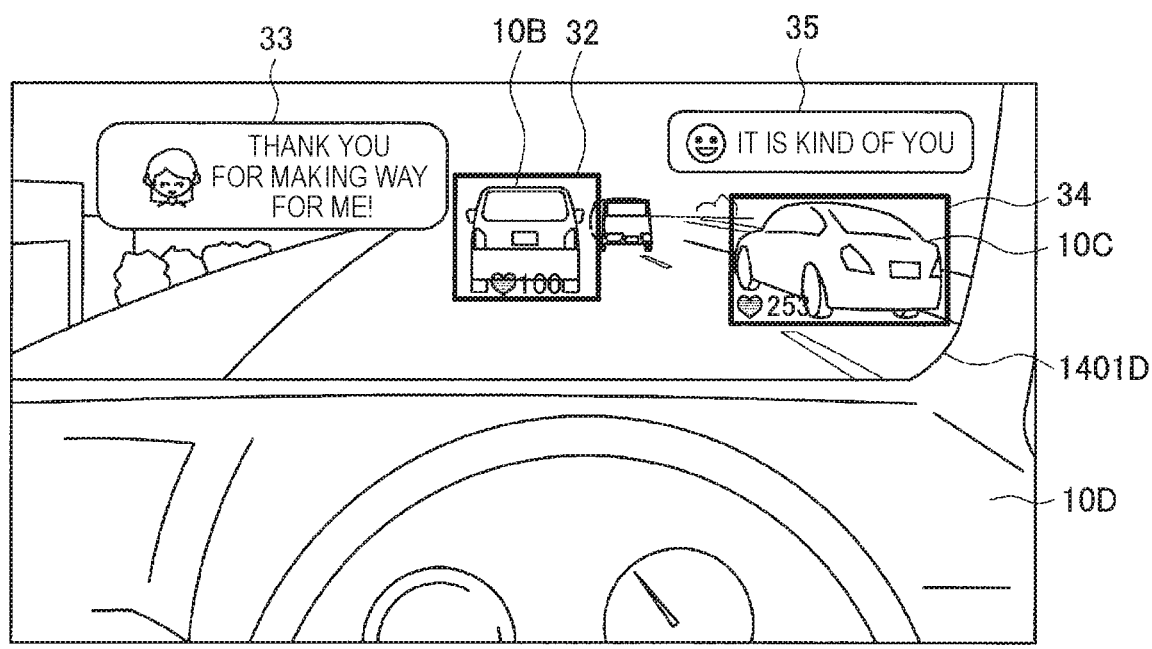
FIG. 8 is a diagram that describes a case where evaluation information of the other vehicle according to the first embodiment in a vicinity is displayed.

The notification control section 1104 then performs control such that the vehicle-to-vehicle communication section 1201 displays the evaluation information acquired from the vehicle in the vicinity on the display section 1401 in accordance with the estimation result of the estimation section 1105 (step S132). Here, FIG. 8 is a diagram that describes the case where evaluation information of another vehicle in the vicinity is displayed. In the example illustrated in FIG. 8, the case where the information processing apparatus 100 mounted on a vehicle 10D acquires evaluation information of each vehicle from the vehicles 10B and 10D traveling in the vicinity of the vehicle 10D and notifies the driver of the vehicle 10D is assumed. As illustrated in FIG. 8, on a windshield 1401D of the vehicle 10D, AR display is performed on frame images 32 and 34 displayed to surround the vehicle 10B and the vehicle 10C in order to identify the respective vehicles, and evaluation comment images 33 and 35 that display the most recent evaluation comments input into the respective vehicles. In addition, the frame images 32 and 34 include information indicating the number of times the "thanks" button is pushed for the respective vehicles. This allows the driver of the vehicle 10D to easily know the evaluations of a vehicle traveling in the vicinity. If the number of times the "thanks" button is pushed is large or evaluation comments are favorable, the driver of the vehicle 10D is able to recognize the vehicle traveling in the vicinity as a vehicle having good manners and take a comfortable drive with no worries.

Figure 9:
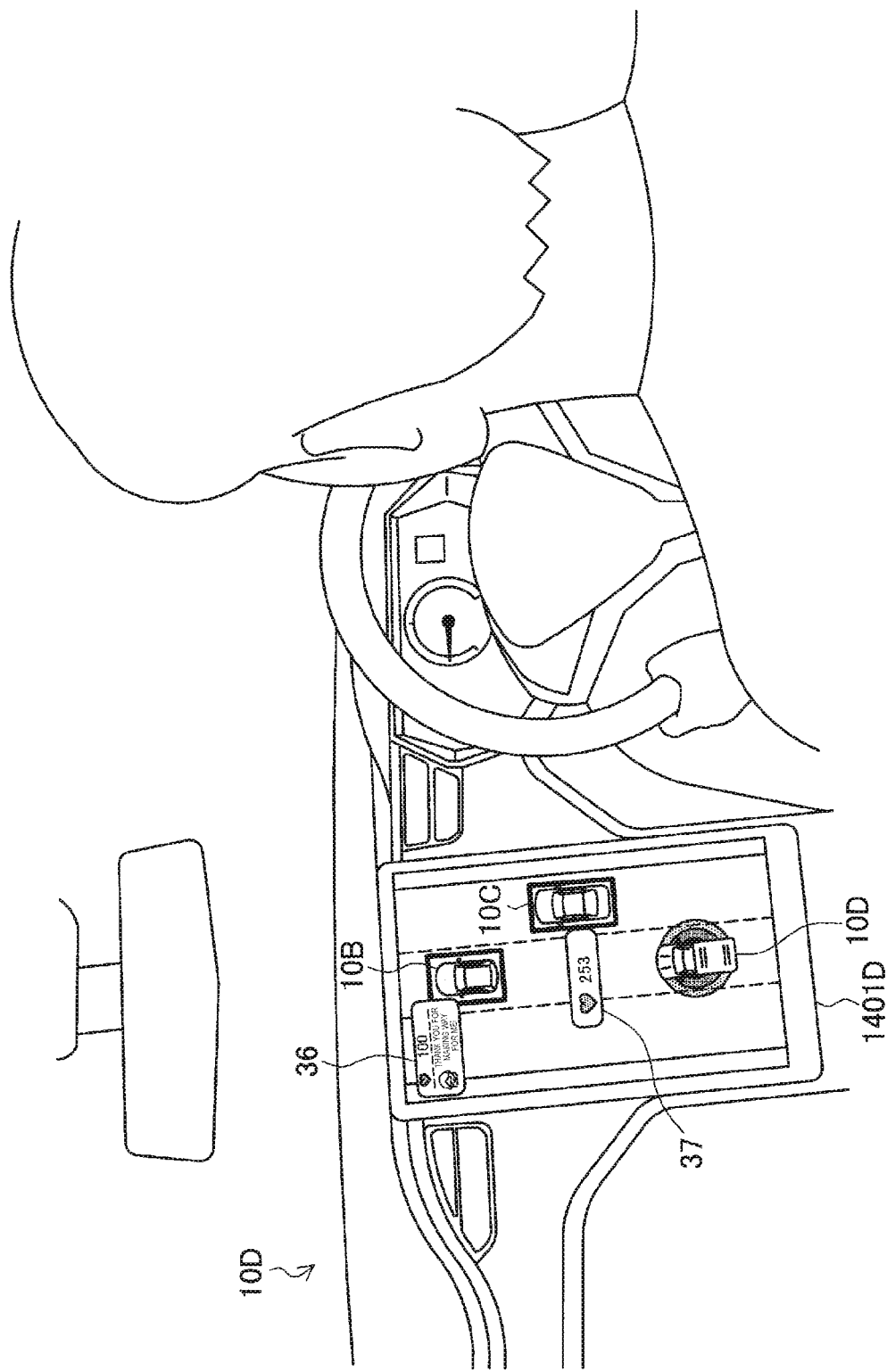
FIG. 9 is a diagram that describes a case where the evaluation information of the other vehicle according to the first embodiment which travels in the vicinity is displayed as a TopView screen.

Note that the display method according to the present embodiment for evaluation information is not limited to AR display on the windshield as illustrated in FIGS. 6 and 8, but, for example, a bird view screen and a top view screen generated as computer graphics (CG) may be displayed, for example, on a display apparatus (which may be a fixed smartphone or the like) installed in the vicinity of the steering. Displaying a bird view or a top view makes it possible to easily grasp the positional relationship between the user vehicle and the vehicle in the surrounding. Here, FIG. 9 is a diagram that describes the case where evaluation information of another vehicle traveling in the vicinity is displayed as a top view screen. As illustrated in FIG. 9, a display apparatus 1401*d* is installed in the vicinity of the steering such that the driver is able to visually recognize the display apparatus 1401*d* without distracting the gaze much from the front while driving. In the display apparatus 1401*d*, the user vehicle (vehicle 10D) and the vehicles 10B and 10C in the vicinity are displayed on the map. An image displayed on the display apparatus 1401*d* can be generated, for example, by the notification control section 1104. The positional relationship with each vehicle is grasped on the basis of a signal received from each vehicle or an image captured by the camera. The number of "thanks" or evaluation information display images 36 and 37 that display evaluation comments are then, for example, partially superimposed on the vehicles 10B and 10C in association with the vehicles 10B and 10C. This allows the user of the vehicle 10D to easily grasp the evaluations of the vehicles in the vicinity.

Figure 10:
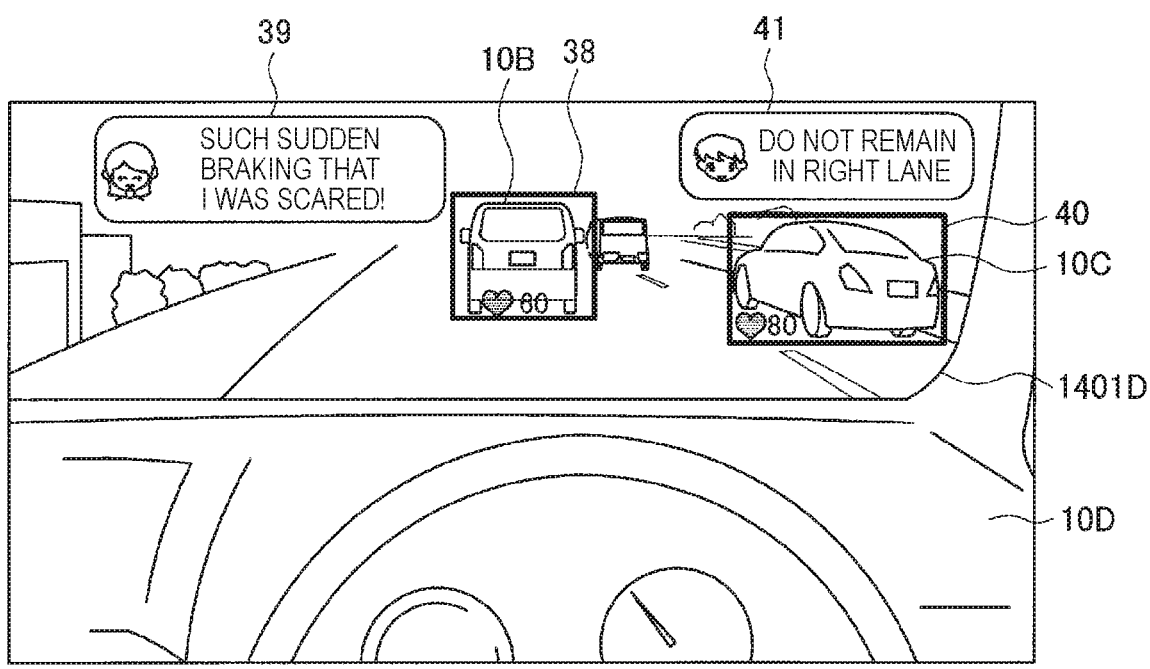
FIG. 10 is a diagram that describes a case where the evaluation information of the target vehicle according to the first embodiment is negative.

In addition, an evaluation to be displayed is not limited to positive information, but, needless to say, negative information is also assumed. FIG. 10 is a diagram that describes the case where the evaluation information of the target vehicle is negative. As illustrated in FIG. 10, for example, on the windshield 1401D of the vehicle 10D, a frame image 38 including the number of "thanks" and an evaluation comment image 39 are displayed in association with the vehicle 10B, and a frame image 40 including the number of "thanks" and an evaluation comment image 41 are displayed in association with the vehicle 10C. This allows the driver of the vehicle 10D to easily know the evaluations of a vehicle traveling in the vicinity. If the number of times the "thanks" button is pushed is small or evaluation comments are unfavorable, the driver of the vehicle 10D is able to recognize the vehicle traveling in the vicinity as a vehicle having bad manners and avoid an accident by driving with particular attention to the movement of the target vehicle or keeping a distance from the target vehicle.

3-2. Second Embodiment

Next, with reference to FIGS. 11 to 16, an information processing system according to a second embodiment will be described. In the second embodiment, the use of speed information of another vehicle will be described.

Figure 11:
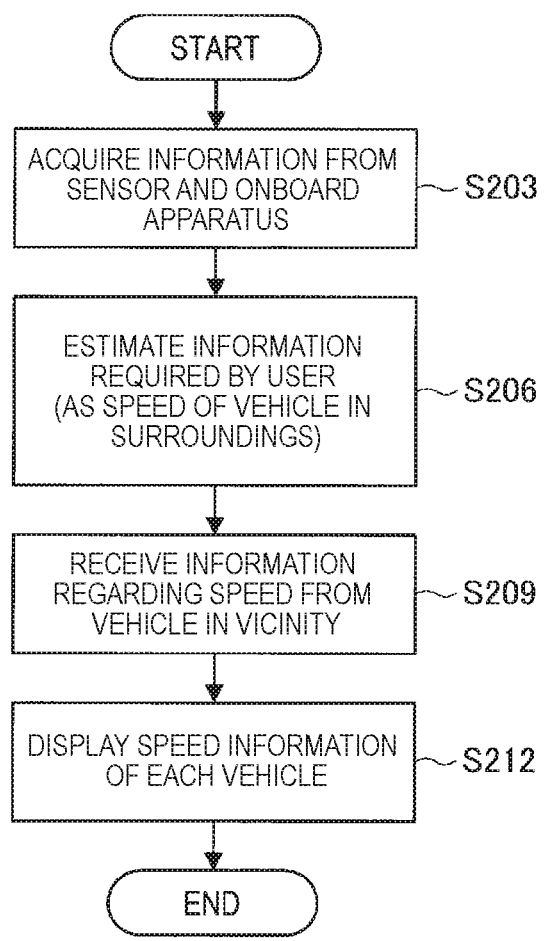
FIG. 11 is a flowchart illustrating display processing of speed information of another vehicle according to a second embodiment.

FIG. 11 is a flowchart illustrating display processing of speed information of another vehicle according to the second embodiment. As illustrated in FIG. 11, the estimation section 1105 of the information processing apparatus 100 first acquires information for estimating information required by the user (here, driver) from the sensor 1302 and the onboard apparatus 1301 (step S203). For example, the estimation section 1105 acquires gaze information and a captured image from the sensor 1302, the current position from the onboard apparatus 1301, a driving situation, and the like.

Next, the estimation section 1105 estimates, on the basis of the acquired information, information that is currently required by the driver (or information that is currently suitable for the driver) (step S206). In the present embodiment, for example, in the case where the user vehicle is traveling on the freeway, it is estimated that the driver currently wants to know speed information of a vehicle in the surroundings or the speed information of the vehicle in the surroundings is currently suitable.

Next, the vehicle-to-vehicle communication section 1201 acquires speed information from the vehicle in the vicinity in accordance with an estimation result of the estimation section 1105 (step S209). Specifically, speed information detected from an onboard apparatus of each vehicle is acquired.

Figure 12:
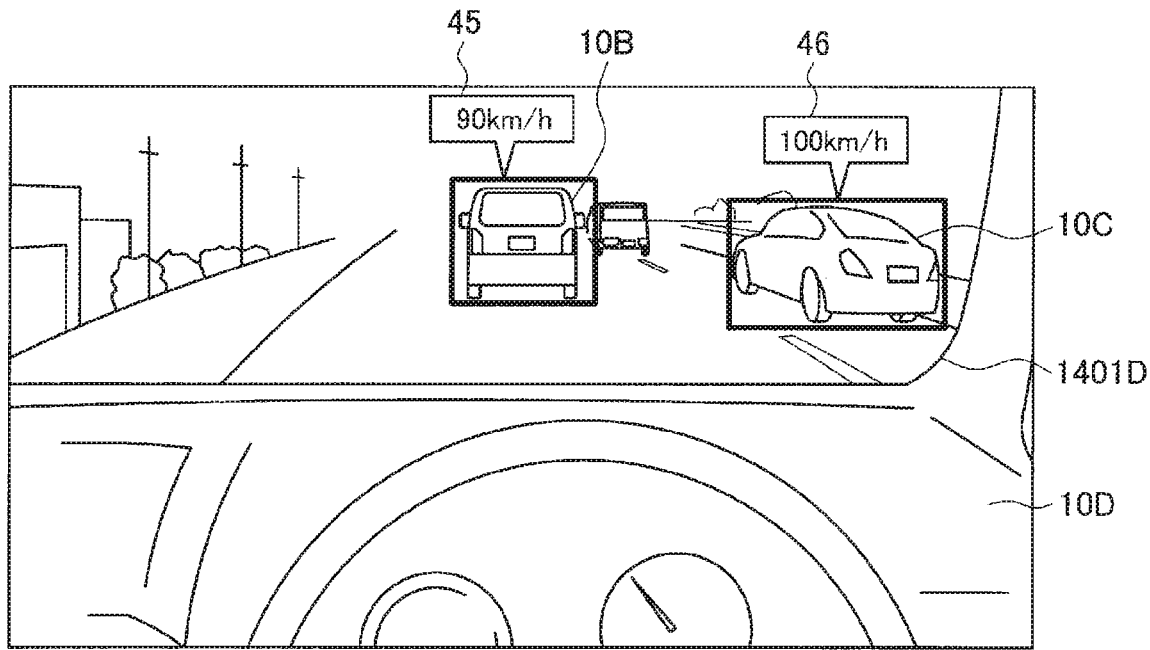
FIG. 12 is a diagram that describes a case where the speed information of the other vehicle according to the second embodiment in a vicinity is displayed.

The notification control section 1104 then performs control such that the vehicle-to-vehicle communication section 1201 displays the speed information acquired from the vehicle in the vicinity on the display section 1401 in accordance with the estimation result of the estimation section 1105 (step S212). Here, FIG. 12 is a diagram that describes the case where speed information of another vehicle in the vicinity is displayed. In the example illustrated in FIG. 12, the case where the information processing apparatus 100 mounted on a vehicle 10D acquires speed information of each vehicle from the vehicles 10B and 10C traveling in the vicinity of the vehicle 10D and notifies the driver of the vehicle 10D is assumed. As illustrated in FIG. 12, on the windshield 1401D of the vehicle 10D, AR display is performed on speed display images 45 and 46 that display the speed of the respective vehicles. This allows the driver of the vehicle 10D to easily know the speed of a vehicle traveling in the vicinity and to avoid over-speeding along with a vehicle traveling at too high speed or accurately determine whether to pass a vehicle traveling at particularly low speed.

Note that the display method according to the present embodiment for speed information is not limited to AR display on the windshield, but, for example, a bird view screen and a top view screen generated as computer graphics (CG) may be displayed, for example, on a display apparatus (which may be a fixed smartphone or the like) installed in the vicinity of the steering.

Figure 13:
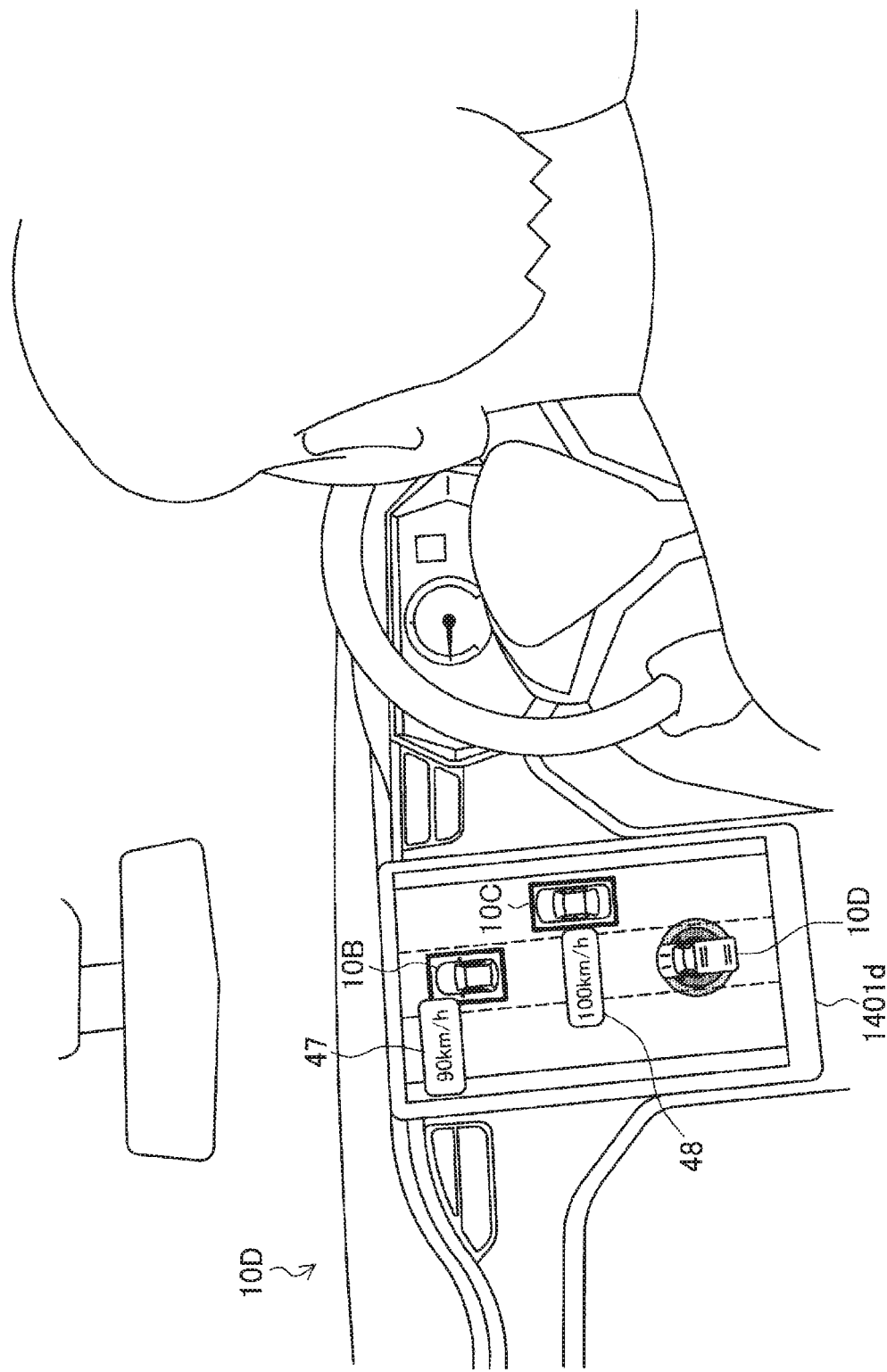
FIG. 13 is a diagram that describes a case where the speed information of the other vehicle according to the second embodiment which travels in the vicinity is displayed as a TopView screen.

FIG. 13 is a diagram that describes the case where speed information of another vehicle traveling in the vicinity is displayed as a top view screen. As illustrated in FIG. 13, in the display apparatus 1401d installed in the vicinity of the steering, the user vehicle (vehicle 10D) and the vehicles 10B and 10C in the vicinity are displayed on the map. Speed information display images 47 and 48 indicating speed information are then displayed, for example, to be partially superimposed on the vehicles 10B and 10C in association with the vehicles 10B and 10C. This allows the user of the vehicle 10D to easily grasp the speed of the vehicles in the vicinity.

Figure 14:
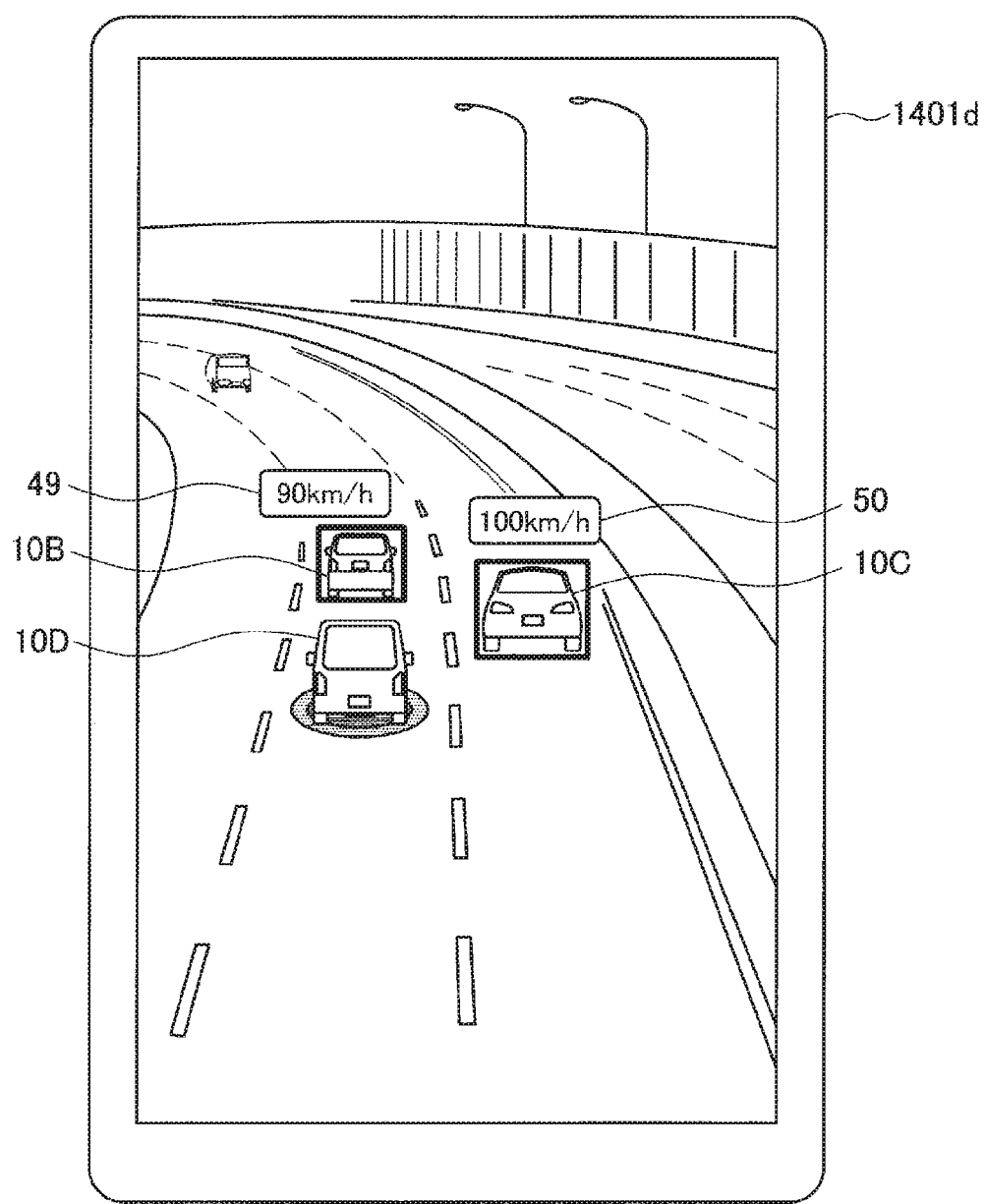
FIG. 14 is a diagram that describes a case where the speed information of the other vehicle according to the second embodiment which travels in the vicinity is displayed as a bird view screen.

FIG. 14 is a diagram that describes the case where speed information of another vehicle traveling in the vicinity is displayed as a bird view screen. In the illustrated example, on the screen of the display apparatus 1401d, a CG image is displayed that assumes the case where the user vehicle (vehicle 10D) and the vehicles 10B and 10C in the vicinity are shown from the rear-top perspective. The positional relationship with each vehicle is grasped on the basis of a signal received from each vehicle or an image captured by the camera. Speed information display images 49 and 50 indicating speed information are then displayed, for example, to be partially superimposed on the vehicles 10B and 10C in association with the vehicles 10B and 10C. This allows the user of the vehicle 10D to easily grasp the speed of the vehicles in the vicinity.

In the second embodiment described above, the case where the speed of a target vehicle is received from the target vehicle through vehicle-to-vehicle communication section 1201 has been described, but the present embodiment is not limited thereto.

Figure 15:
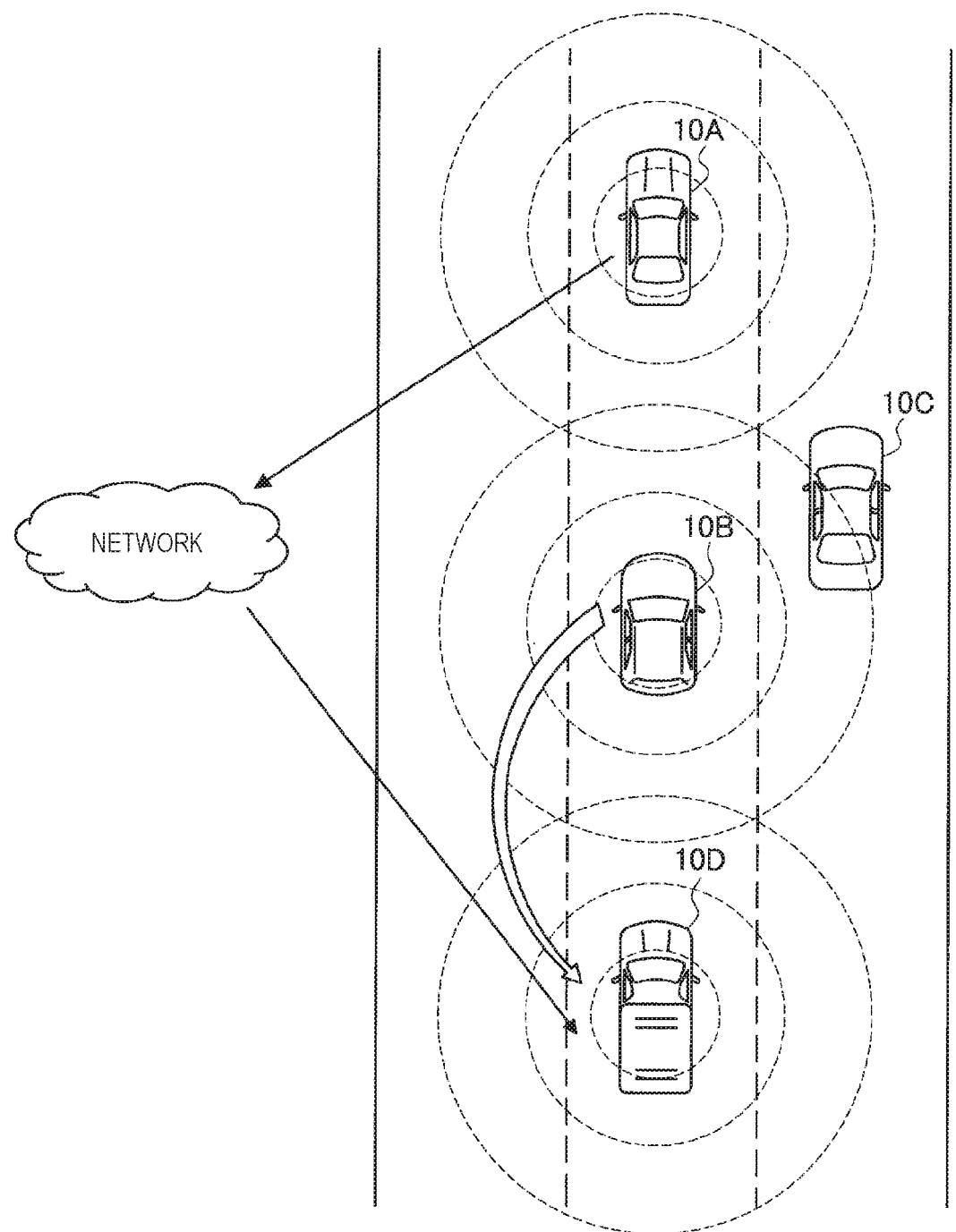
FIG. 15 is a diagram that describes an information acquisition route from the other vehicle according to the second embodiment.

FIG. 15 is a diagram that describes an information acquisition route from another vehicle. As illustrated in FIG. 15, for example, the vehicle 10D can acquire speed information of the vehicle 10B through vehicle-to-vehicle communication, but can acquire speed information of the vehicle 10A traveling at a distant position via the network. In addition, in the case where the vehicle 10C does not support any communication, the recognition section 1101 of the information processing apparatus 100 mounted on the vehicle 10D may calculate the relative speed of the vehicle 10C on the basis of an analysis result of a captured image obtained by imaging the vehicle 10C, distance information acquired from the stereo-camera, distance information acquired from the infrared sensor, or the like, and estimate the speed of the vehicle 10C on the basis of the speed of the own vehicle.

In addition, another vehicle also estimates the speed of the vehicle 10C. The vehicle 10D can also acquire the speed information of the vehicle 10C which is estimated by the other vehicle through vehicle-to-vehicle communication or network communication. In the case where the speed of the target vehicle is acquired in this way with a variety of techniques, the information processing apparatus 100 of the vehicle 10D may employ and display information of the highest reliability. It will be specifically described below with reference to FIG. 16.

FIG. 16 is a diagram illustrating a speed information list of a vehicle in the vicinity which is acquired by the vehicle 10D (own vehicle). In the illustrated example, speed information of the vehicles 10A, 10B, and 10C which is estimated by each of the vehicles 10D (own vehicle), 10A, and 10B is shown. The vehicle 10D can acquire the speed information of the vehicles 10A, 10B, and 10C which is estimated by each of the vehicles 10A and 10B through vehicle-to-vehicle communication or network communication. It is assumed that the vehicles 10A to 10C have a positional relationship as illustrated in FIG. 15, and the vehicle 10C is a vehicle that does not support any communication.

As illustrated in FIG. 16, each speed information includes a speed error (plus or minus km/h) according to the distance from an estimation subject to an estimation object. For example, among the speed information of the vehicles 10A to 10C estimated by the vehicle 10D on the basis of captured images or the like, speed information of a target vehicle more distant from the vehicle 10D has a greater speed error as illustrated in FIG. 15. The same applies to the case where the vehicles 10A and 10B are estimation subjects. Note that, in the case where an estimation subject and an estimation object are the same, the speed error is 0 km/h.

The notification control section 1104 of the information processing apparatus 100 mounted on the vehicle 10D performs control such that speed information having the smallest speed error is employed from the speed information of each of the other vehicles, and is displayed on the display section 1401. Thus, in the case of the example illustrated in FIG. 16, as the speed information of the vehicle 10A, a speed of "95 km/h (error 0 km/h)" estimated by the vehicle 10A is employed. As the speed information of the vehicle 10B, a speed of "86 km/h (error 0 km/h)" estimated by the vehicle 10B is employed. As the speed information of the vehicle 10C, a speed of "94 km/h (error 1 km/h)" estimated by the vehicle 10B, which is the closest to the vehicle 10C, is employed.

3-3. Third Embodiment

Next, with reference to FIGS. 17 to 20, an information processing system according to a third embodiment will be described. In the third embodiment, the use of information regarding the acceleration and deceleration of another vehicle will be described.

Figure 17:
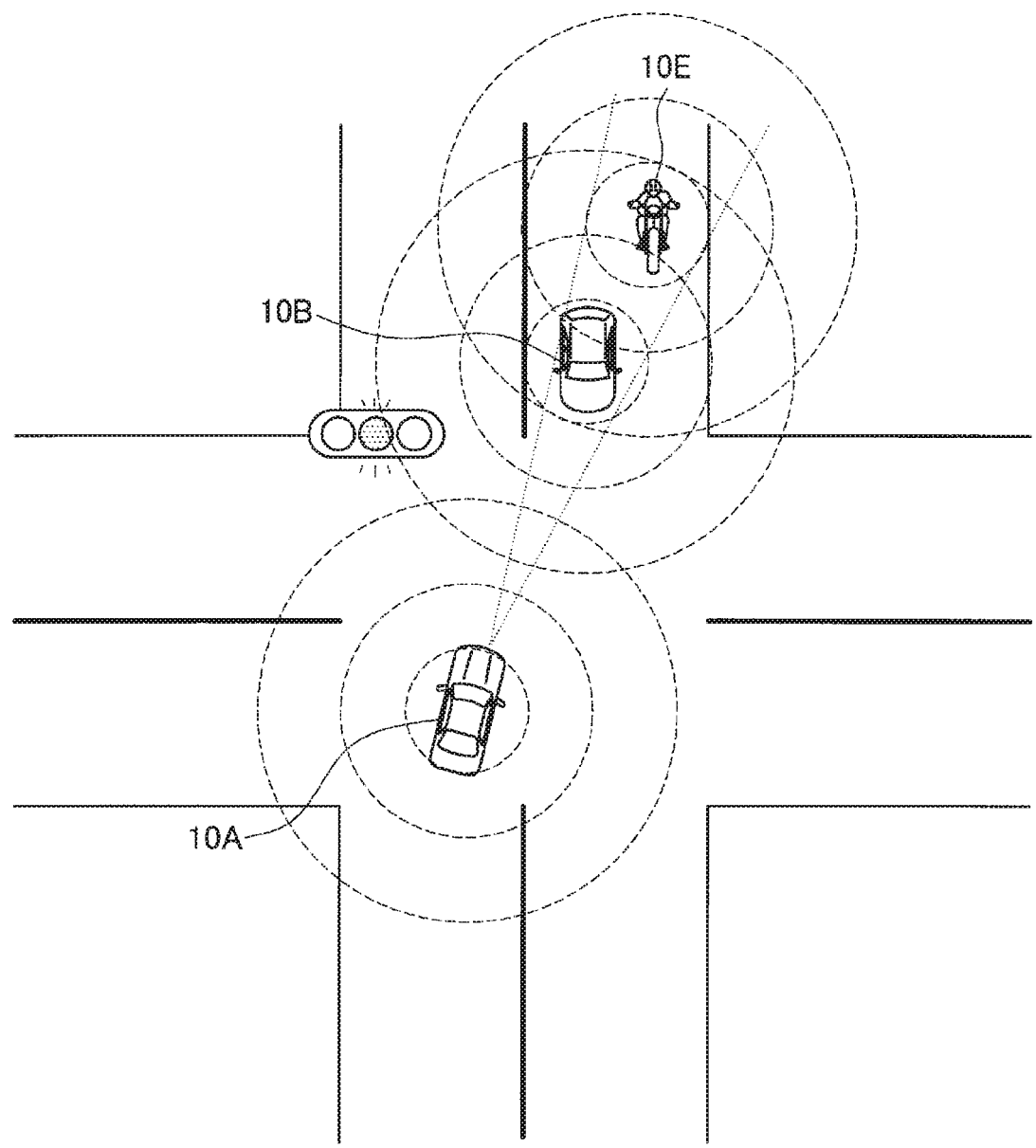
FIG. 17 is a diagram that describes an overview of an information processing system according to a third embodiment.

FIG. 17 is a diagram that describes the overview of the information processing system according to the third embodiment. As illustrated in FIG. 17, the driver of the vehicle 10A waiting to turn right at an intersection is able to know that the oncoming vehicle 10B is decelerating in accordance with the amber light, but is unable to visually grasp the movement of a vehicle 10E (here, motorcycle) in a blind spot of the vehicle 10B. In this case, when the vehicle 10A attempts to turn right at the intersection, the vehicle 10A is quite likely to come into contact with the vehicle 10E that comes straight and have an accident. Thus, in the present embodiment, for example, it is possible to offer assistance in safer driving by acquiring the acceleration or deceleration of a vehicle in the surroundings and notifying a driver when the vehicle is turning at the corner. In the example illustrated in FIG. 17, grasping the information that the vehicle 10E present in a blind spot of the vehicle 10B is accelerating makes it possible to wait for the vehicle 10E to come straight, and then turn right safely.

Figure 18:
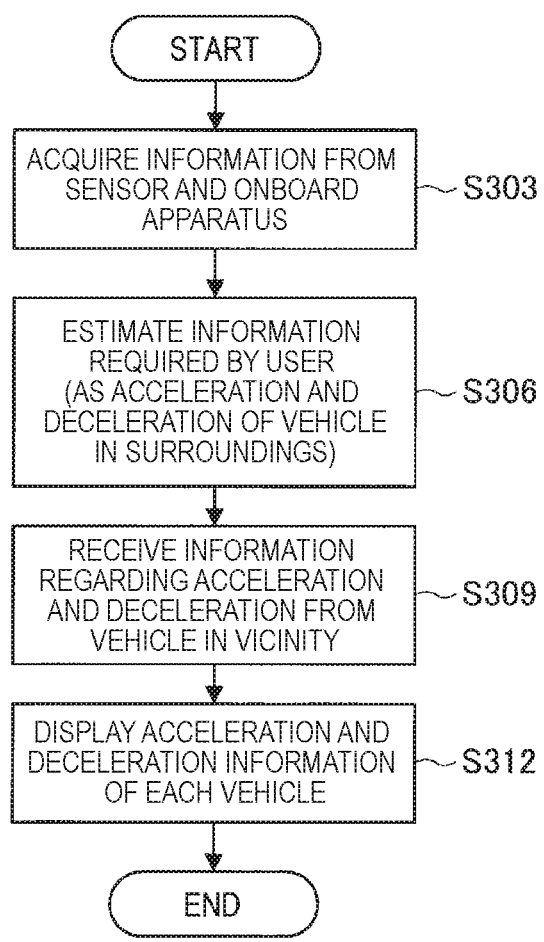
FIG. 18 is a flowchart illustrating display processing of acceleration information of another vehicle according to the third embodiment.

FIG. 18 is a flowchart illustrating display processing of acceleration information of another vehicle according to the third embodiment. As illustrated in FIG. 18, the estimation section 1105 of the information processing apparatus 100 first acquires information for estimating information required by the user (here, driver) from the sensor 1302 and the onboard apparatus 1301 (step S303). For example, the estimation section 1105 acquires gaze information and a captured image from the sensor 1302, the current position from the onboard apparatus 1301, a driving situation, and the like.

Next, the estimation section 1105 estimates, on the basis of the acquired information, information that is currently required by the driver (or information that is currently suitable for the driver) (step S306). In the present embodiment, for example, in the case where the user vehicle waits to turn right/left at an intersection, it is estimated that the driver currently wants to know acceleration and deceleration information of a vehicle in the surroundings or the acceleration and deceleration information of the vehicle in the surroundings is currently suitable.

Next, the vehicle-to-vehicle communication section 1201 acquires acceleration and deceleration information from the vehicle in the vicinity in accordance with an estimation result of the estimation section 1105 (step S309). Specifically, acceleration and deceleration information detected from the onboard apparatus of each vehicle is acquired. Note that, even in the case where, as illustrated in FIG. 17, the vehicle 10A is distant from the vehicle 10E and vehicle-to-vehicle communication is not possible, the vehicle 10A may be capable of acquiring information of the vehicle 10E from the vehicle 10B as information of a vehicle in the surroundings which is received by the vehicle 10E. This allows the vehicle 10A to acquire even information of a bicycle or a motorcycle tens of meters ahead, which has low reliability.

Figures 19, 20:
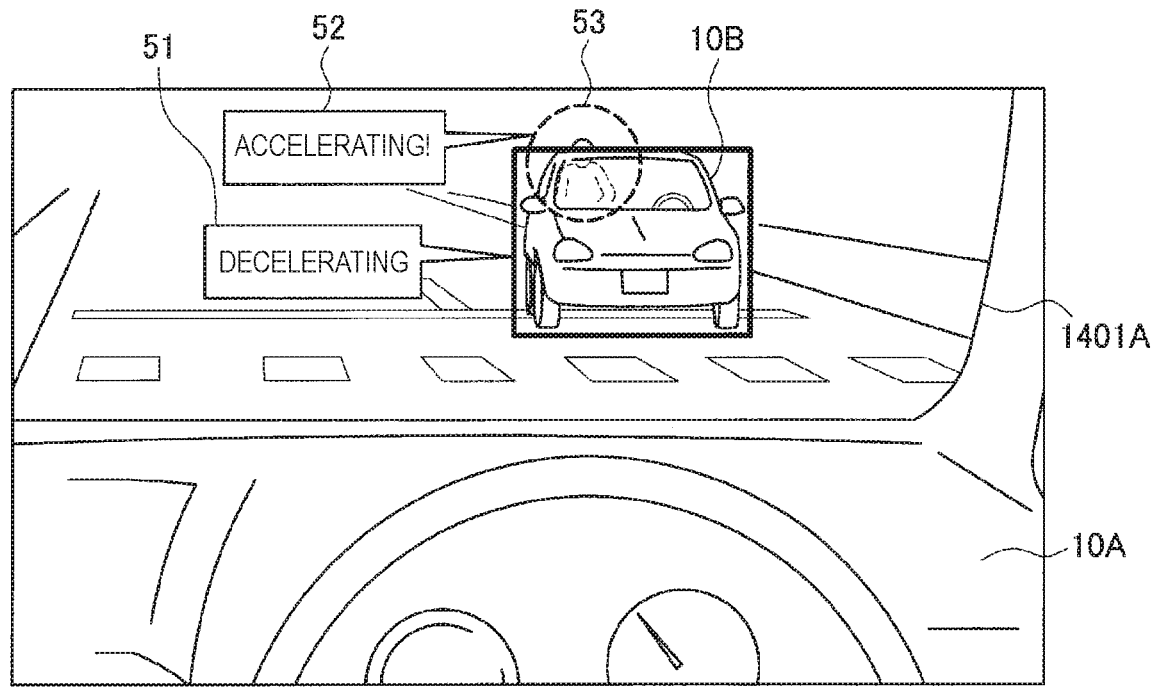
FIG. 19 is a diagram that describes a case where acceleration and deceleration information of the other vehicle according to the third embodiment in a vicinity is displayed.
FIG. 20 is a diagram illustrating an acceleration and deceleration information list of a vehicle in the vicinity which is acquired by an own vehicle according to the third embodiment.

The notification control section 1104 then performs control such that the vehicle-to-vehicle communication section 1201 displays the acceleration and deceleration information acquired from the vehicle in the vicinity on the display section 1401 in accordance with the estimation result of the estimation section 1105 (step S312). Here, FIG. 19 is a diagram that describes the case where acceleration and deceleration information of another vehicle in the vicinity is displayed. In the example illustrated in FIG. 19, the case where the information processing apparatus 100 mounted on a vehicle 10D acquires acceleration information of a vehicle in the vicinity of an intersection and notifies the driver of the vehicle 10D is assumed. As illustrated in FIG. 19, on the windshield 1401D of the vehicle 10D, AR display is performed on speed display images 51 and 52 that display the acceleration and deceleration of the respective vehicles. The vehicle 10E is in a blind spot of the vehicle 10B, and not visually recognizable to the driver. However, as illustrated in FIG. 19, emphasized display 53 is displayed to explicitly show the hidden vehicle 10E. This allows the driver of the vehicle 10D to easily grasp that the oncoming vehicle 10B is decelerating, but the vehicle 10E is present in the blind spot, and, moreover, the vehicle 10E is accelerating. It is possible to prevent an accident.

In the third embodiment described above, the acceleration and deceleration information of the vehicle 10B is received from the vehicle 10B, but the present embodiment is not limited thereto. The recognition section 1101 of the information processing apparatus 100 is also capable of estimating the acceleration and deceleration of a target vehicle on the basis of an analysis of a captured image taken by the camera, distance information acquired from the stereo-camera, or distance information acquired from the infrared sensor.

Alternately, the notification control section 1104 may perform control such that acceleration and deceleration information having high reliability is employed from the acquired acceleration and deceleration information of vehicles in the vicinity and the driver is notified. It will be made specific below with reference to FIG. 20.

FIG. 20 is a diagram illustrating an acceleration and deceleration information list of a vehicle in the vicinity which is acquired by the vehicle 10A (own vehicle). In the illustrated example, acceleration and deceleration information of the vehicles 10B and 10E which is estimated by each of the vehicles 10A (own vehicle) and 10B is shown. The vehicle 10A can acquire the acceleration and deceleration information of the vehicle 10A and the vehicle 10E which is estimated by the vehicle 10B through vehicle-to-vehicle communication or network communication. The vehicles 10A, 10B, and 10E have a positional relationship as illustrated in FIG. 17, and the vehicle 10E is hidden in a blind spot of the vehicle 10B. In addition, it is assumed here that the vehicle 10E is a vehicle that does not support any communication.

As illustrated in FIG. 20, each speed information includes reliability (percentage) according to the positional relationship between an estimation subject and an estimation object. For example, the recognition section 1101 of the information processing apparatus 100 mounted on the vehicle 10A can estimate the acceleration or deceleration of the vehicle 10B on the basis of a captured image taken by the camera, distance information acquired by the stereo-camera, distance information acquired by the infrared sensor, or the like. In the case where the vehicle 10B is a little distant from the vehicle 10A, for example, an acceleration reliability of 40% and a deceleration reliability of 60% are obtained. Meanwhile, in the case where an estimation subject and an estimation object are the same, a reliability of 100% is obtained. In addition, it is not possible to sense the vehicle 10E from the vehicle 10A with the camera, the infrared sensor, or the like, so that estimation is impossible. In addition, an estimation result of the vehicle 10E with the vehicle 10B serving as a subject has a reliability of 100% because the vehicle 10E is close to the vehicle 10B.

The notification control section 1104 of the information processing apparatus 100 mounted on the vehicle 10A performs control such that acceleration and deceleration information having the highest reliability is employed from the acceleration and deceleration information of each of the other vehicles, and is displayed on the display section 1401. Thus, in the case of the example illustrated in FIG. 20, acceleration and deceleration information "deceleration (reliability of 100%)" estimated by the vehicle 10B is employed for the acceleration and deceleration of the vehicle 10B, and acceleration and deceleration information "acceleration (reliability of 100%)" estimated by the vehicle 10B is employed for acceleration and deceleration information of the vehicle 10E.

3-4. Fourth Embodiment

Next, with reference to FIGS. 21 to 24, an information processing system according to a fourth embodiment will be described. In the fourth embodiment, the use of information regarding whether or not another vehicle recognizes the own vehicle (another vehicle's awareness of the own vehicle) will be described.

Figure 21:
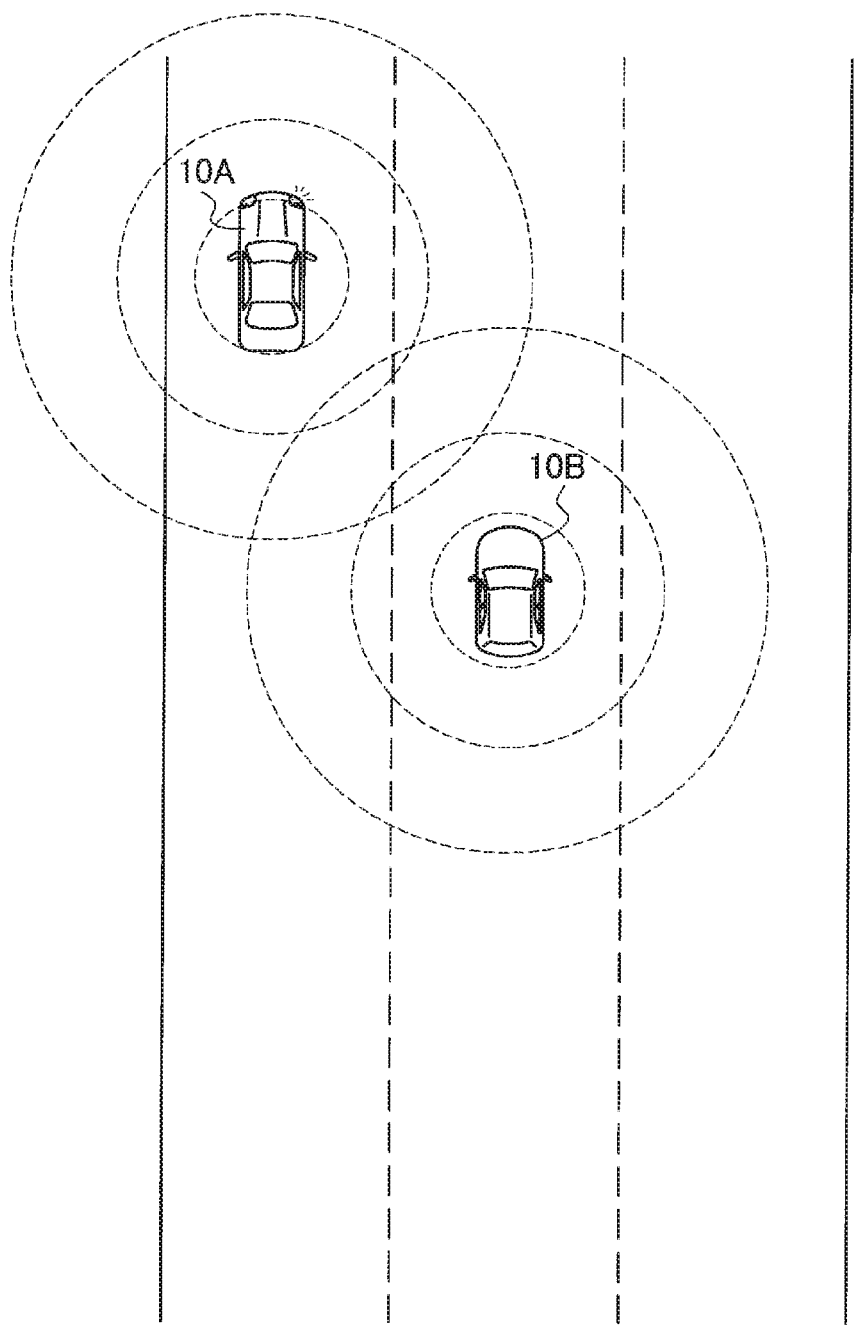
FIG. 21 is a diagram that describes an overview of an information processing system according to a fourth embodiment.

FIG. 21 is a diagram that describes the overview of the information processing system according to the fourth embodiment. As illustrated in FIG. 21, for example, in the case where the vehicle 10A traveling in the left lane ahead gives a right turn signal when the vehicle B is traveling, the driver of the vehicle 10B is interested in whether or not the vehicle 10A is aware of the own vehicle in a blind spot behind the vehicle 10A on the right. If the driver of the vehicle 10B knows that the vehicle 10A is aware of the own vehicle (vehicle 10B), the driver of the vehicle 10B is able to decelerate with no worries because there seems to be no sudden lane change, and wait for the vehicle 10A to change lanes. A notification of whether or not the vehicle 10A is aware of the own vehicle (vehicle 10B) is issued, for example, from the vehicle 10A through vehicle-to-vehicle communication. In this way, the information regarding whether or not a target vehicle recognizes the presence of the own vehicle is useful not only when a preceding vehicle changes lanes, but also, for example, in the case where a preceding vehicle recedes or in the case where a following vehicle approaches with no deceleration while the own vehicle is decelerating because of the red light or traffic congestion. The following describes specific operation processing according to the present embodiment with reference to FIG. 22.

Figure 22:
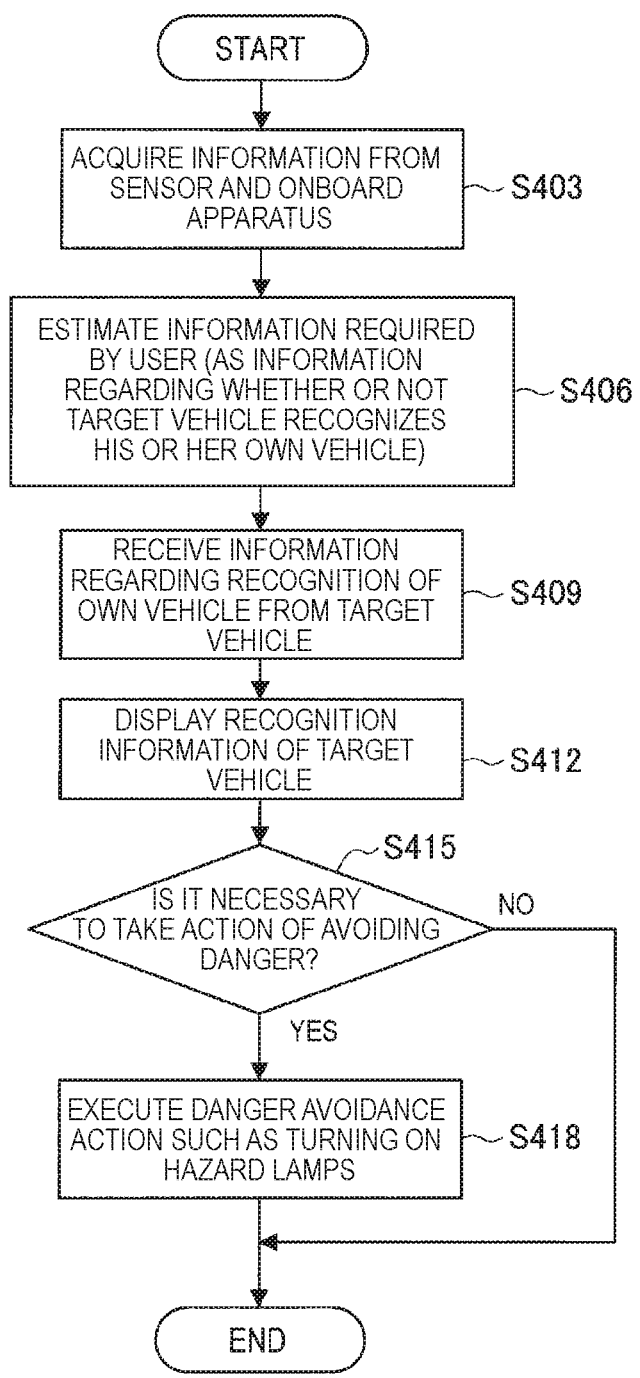
FIG. 22 is a flowchart illustrating display processing of recognition information of another vehicle according to the fourth embodiment.

FIG. 22 is a flowchart illustrating display processing of recognition information of another vehicle according to the fourth embodiment. As illustrated in FIG. 22, the estimation section 1105 of the information processing apparatus 100 first acquires information for estimating information required by the user (here, driver) from the sensor 1302 and the onboard apparatus 1301 (step S403). For example, the estimation section 1105 acquires gaze information and a captured image from the sensor 1302, the current position from the onboard apparatus 1301, a driving situation, and the like.

Next, the estimation section 1105 estimates, on the basis of the acquired information, information that is currently required by the driver (or information that is currently suitable for the driver) (step S406). In the present embodiment, for example, it is estimated that the driver wants to know information (which will also be referred to as recognition information) regarding whether or not a target vehicle recognizes (aware of) the own vehicle, or the recognition information is currently suitable for the driver.

Next, the vehicle-to-vehicle communication section 1201 acquires recognition information from the target vehicle in accordance with an estimation result of the estimation section 1105 (step S409). Specifically, recognition information of the driver detected from the onboard apparatus or the gaze sensor of a target vehicle or recognition information of the vehicle in the case of self-driving is acquired.

Figure 23:
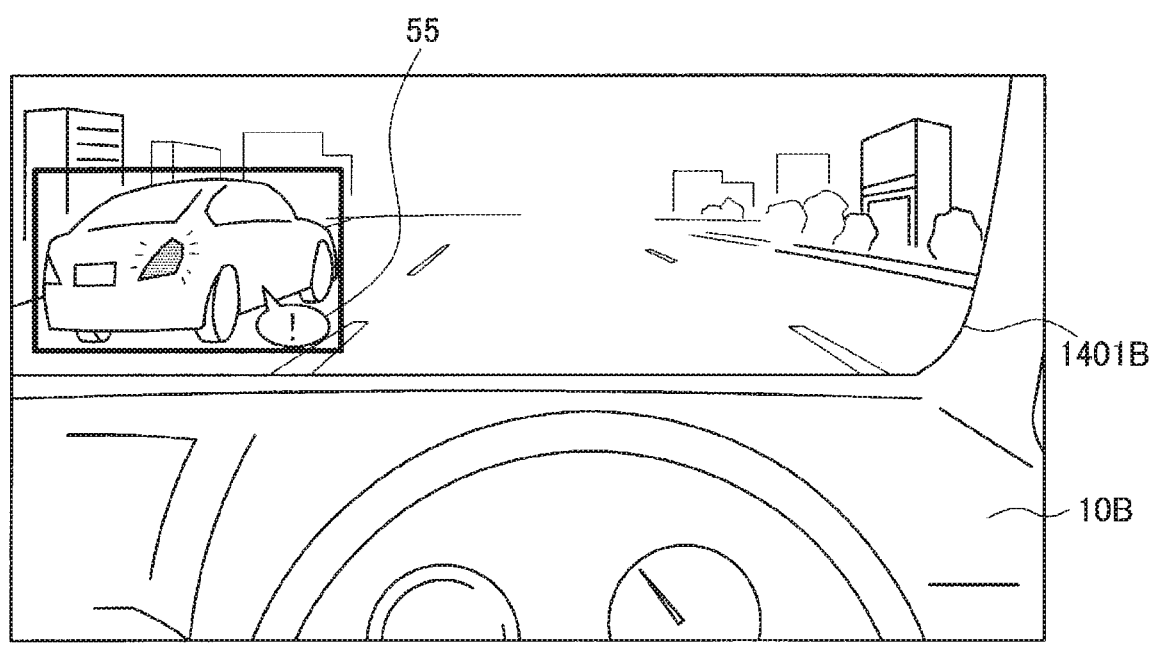
FIG. 23 is a diagram that describes a case where recognition information of a target vehicle according to the fourth embodiment is displayed.

Next, the notification control section 1104 performs control such that the vehicle-to-vehicle communication section 1201 displays the recognition information acquired from the vehicle in the vicinity on the display section 1401 in accordance with the estimation result of the estimation section 1105 (step S412). Here, FIG. 23 is a diagram that describes the case where recognition information of a target vehicle is displayed. In the illustrated example, AR display is performed on an awareness display image 55 that shows that the target vehicle recognizes the own vehicle on the windshield 1401B of the vehicle 10B. The target vehicle is identified by the recognition section 1101 on the basis of gaze information of the driver of the vehicle 10B, a captured image of the camera, or the like. Meanwhile, in the case where the target vehicle does not recognize the own vehicle, or in the case where it is unknown whether or not the target vehicle recognizes the own vehicle, a question mark may be displayed. This allows the driver of the vehicle 10B to easily grasp, for example, whether or not a target vehicle in the left lane ahead which gives a right turn signal to change lanes is aware of the own vehicle.

Note that the display method according to the present embodiment for recognition information is not limited to AR display on the windshield, but, for example, a bird view screen and a top view screen generated as computer graphics (CG) may be displayed, for example, on a display apparatus (which may be a fixed smartphone or the like) installed in the vicinity of the steering.

Figure 24:
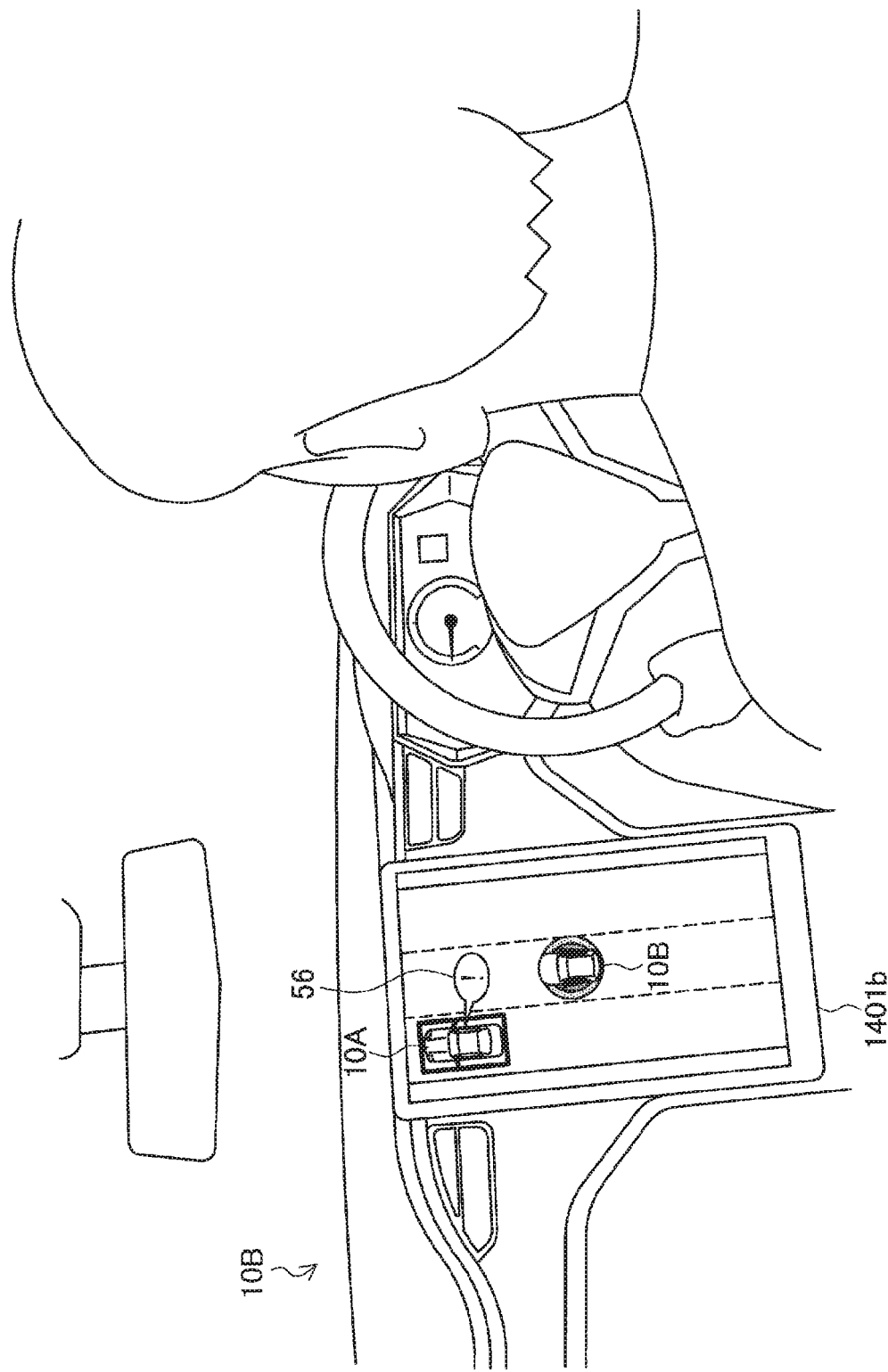
FIG. 24 is a diagram that describes a case where the recognition information of the target vehicle according to the fourth embodiment is displayed as a top view screen.

FIG. 24 is a diagram that describes the case where the recognition information of the target vehicle is displayed as a top view screen. As illustrated in FIG. 24, in a display apparatus 1401b installed in the vicinity of the steering, the user vehicle (vehicle 10B) and the target vehicle 10A are displayed on the map, and an awareness display image 56 that shows that the vehicle 10A is aware of the vehicle 10B is displayed in association with the vehicle 10A. This allows the user of the vehicle 10B to easily grasp that the target vehicle is aware of the own vehicle.

Next, FIG. 22 is referred to again. In the case where the driver-assistance system is mounted on the own vehicle, and it is possible for the information processing apparatus 100 to perform control, the information processing apparatus 100 determines whether or not it is necessary to take an action of avoiding danger in accordance with recognition information of another vehicle (step S415). For example, in the case where a target vehicle is not aware of the own vehicle, but attempts to change lanes or recedes, the information processing apparatus 100 determines that it is necessary to take an action of avoiding danger.

In the case where it is determined to take an action of avoiding danger (step S415/Yes), the information processing apparatus 100 executes a danger avoidance action such as automatically turning on the hazard lamps of the own vehicle (step S418). Alternately, the information processing apparatus 100 may notify the target vehicle of the presence of the own vehicle through vehicle-to-vehicle communication. This makes the target vehicle aware of the presence of the own vehicle, and it is possible to avoid danger.

3-5. Fifth Embodiment

Next, with reference to FIGS. 25 to 27, an information processing system according to a fifth embodiment will be described. In the fifth embodiment, a drive prediction result of the user vehicle based on various kinds of information acquired from another vehicle and a warning notification will be described.

Figure 25:
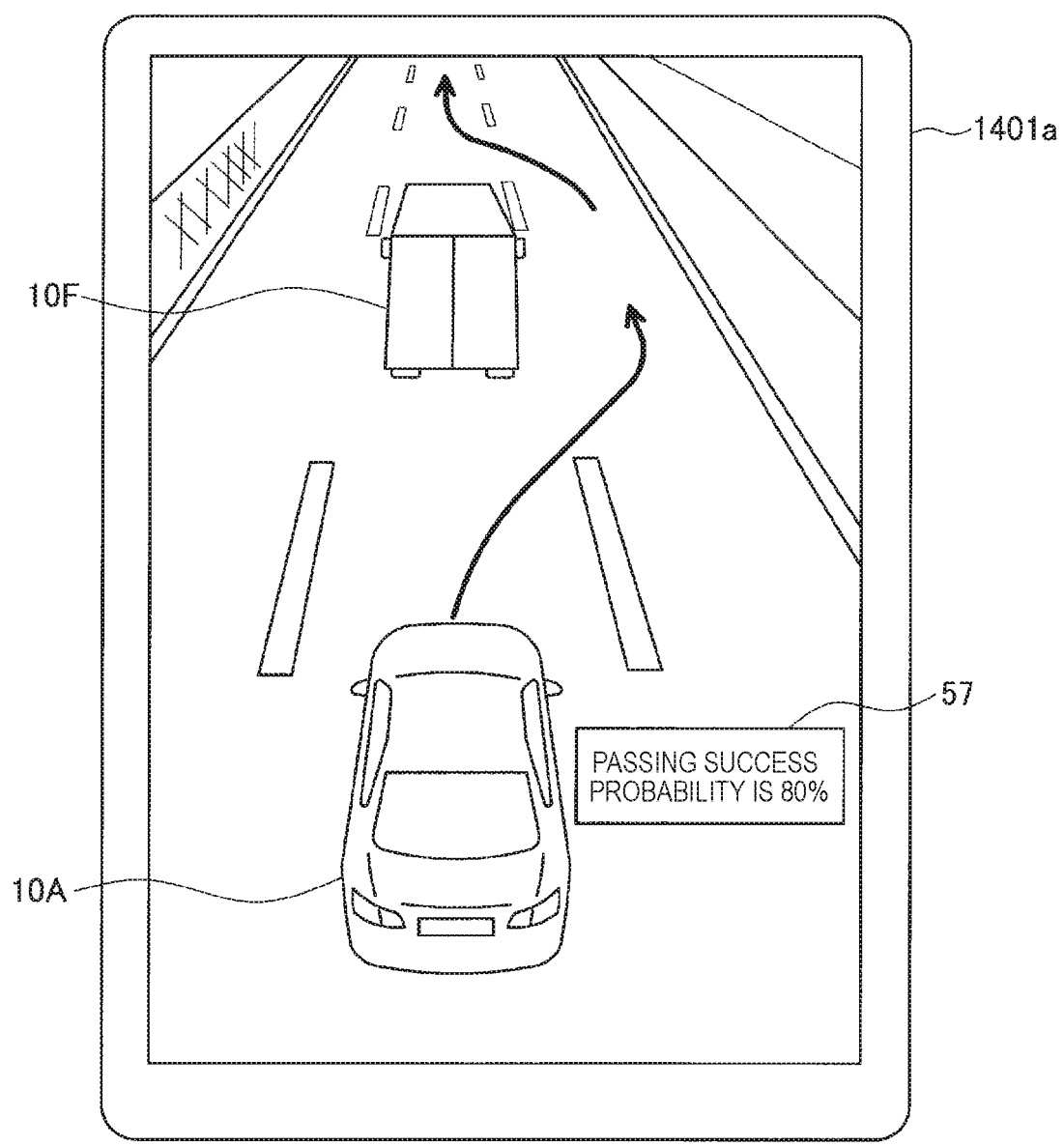
FIG. 25 is a diagram that describes a case where a notification of a drive prediction result of a user vehicle according to a fifth embodiment is issued.

FIG. 25 is a diagram that describes the case where a notification of a drive prediction result of a user vehicle is issued. The information processing apparatus 100 mounted on the user vehicle (here, vehicle 10A) is capable of recognizing the driving situation of the own vehicle acquired from the onboard apparatus 1301 with the recognition section 1101, and displaying, for example, the probability of success in passing a preceding vehicle 10F on the display section 1401 to notify the driver. The passing success probability is calculated by the recognition section 1101, for example, on the basis of the speed of the own vehicle, the driving technique level of the driver (user), the speed of the target vehicle 10F, the presence or absence of another vehicle further ahead of the vehicle 10F or in the passing lane, or the like.

In the illustrated example, for example, on a display apparatus 1401a installed in the vehicle 10A, a notification image 57 that shows the passing success probability of the own vehicle (vehicle 10A) is displayed as a top view screen. In addition, driving navigation in the case of passing is displayed as arrows. This allows the driver to easily grasp his or her own driving situation recognition result, and, for example, in the case where the passing success probability is low, to take a safer drive by stop passing or the like. For example, in the case where the gaze of the driver checks a preceding vehicle, the passing lane, and the traffic in the passing lane behind, says "this car is slow" gazing at the preceding vehicle, or the like, the estimation section 1105 can estimate information regarding passing is currently suitable for the driver and the passing success probability can be displayed on the display section 1401.

Figure 26:
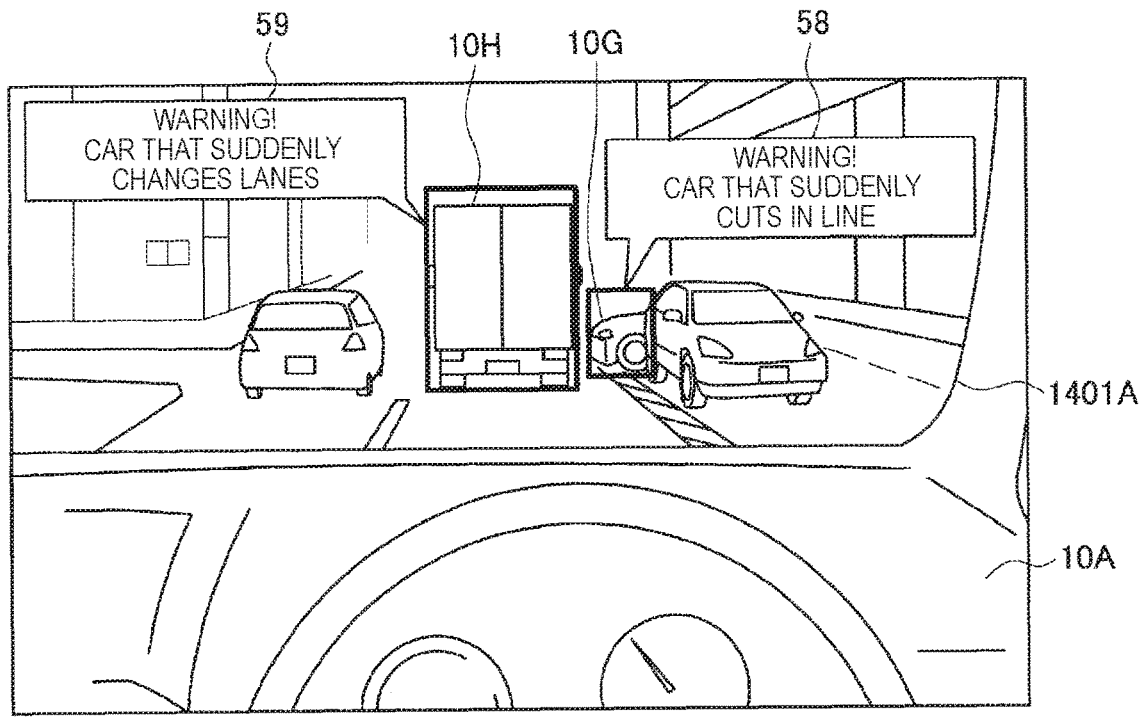
FIG. 26 is a diagram that describes a warning notification based on information acquired from another vehicle according to the fifth embodiment in a vicinity.
Figure 27:
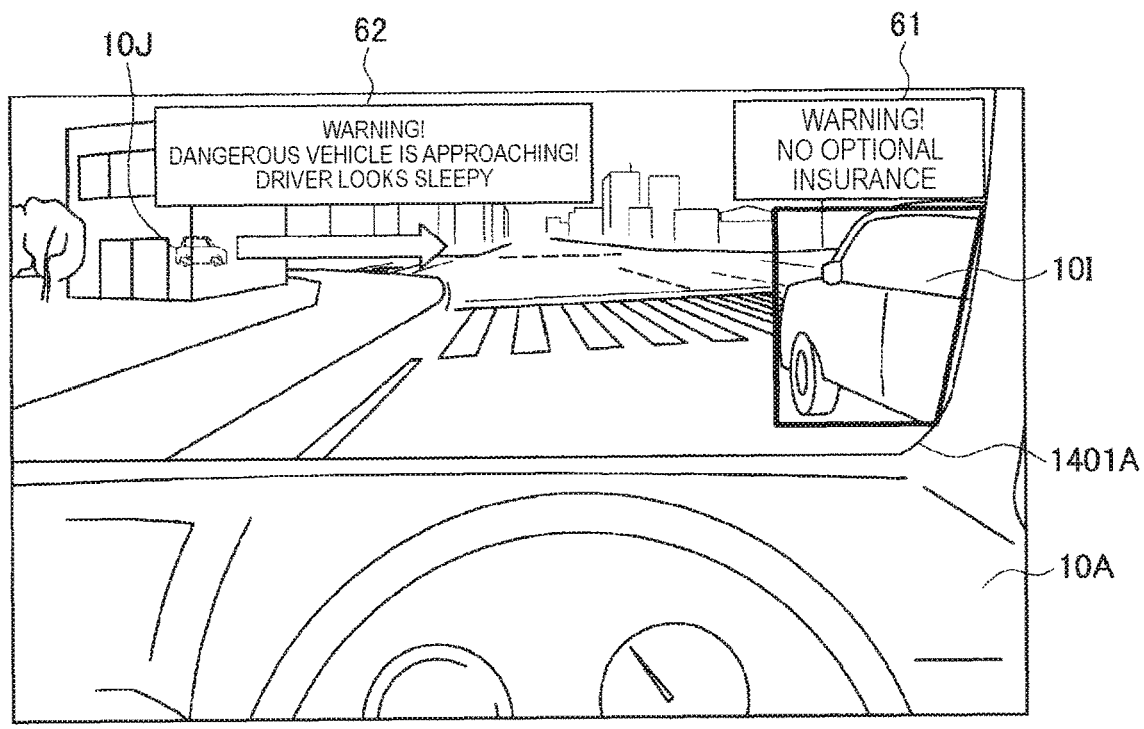
FIG. 27 is a diagram that describes the warning notification based on the information acquired from the other vehicle according to the fifth embodiment in the vicinity.

FIGS. 26 and 27 are diagrams each of which describes a warning notification based on information acquired from another vehicle in a vicinity. In any of FIGS. 26 and 27, AR display is performed on warning notifications on the windshield 1401A of the vehicle 10A. These warning notifications are presented on the basis of a recognition result received by the vehicle-to-vehicle communication section 1201 or the like from another vehicle.

In the example illustrated in FIG. 26, the information processing apparatus 100 mounted on a vehicle 10H transmits the fact that a vehicle 10G entering the lane from a line of stopped vehicles in the right opposite lane is a vehicle that suddenly cuts in line as a recognition result, and AR display is performed on a notification image 58 that shows a warning regarding the vehicle 10G on the windshield 1401A of the vehicle 10A. The information processing apparatus 100 mounted on the vehicle 10G uses the recognition section 1101 to predict and recognize behavior of the driver on the basis of information acquired from the onboard apparatus 1301 or the sensor 1302, and uses the notification control section 1104 to transmit a recognition result to a vehicle in the vicinity through vehicle-to-vehicle communication or the like.

In addition, sudden braking or a sudden lane change is predicted and recognized for the preceding vehicle 10H to avoid contact with the vehicle 10G suddenly cutting in line from the right side, and the recognition result is transmitted to a vehicle in the vicinity through vehicle-to-vehicle communication or the like. The information processing apparatus 100 of the vehicle 10A, which receives the recognition result, performs AR display, as illustrated in FIG. 26, on a notification image 59 that shows a warning regarding the vehicle 10H on the windshield 1401A.

In addition, as illustrated in FIG. 27, on the windshield 1401A of the vehicle 10A, AR display may be performed on a notification image 60 that issues the warning that a vehicle I traveling in the right lane has not purchased automobile insurance. Displaying the profile of a vehicle such as purchase information of automobile insurance makes it possible to alert the driver. These kinds of information can be acquired from the target vehicle I.

In addition, as illustrated in FIG. 27, when a vehicle 10J in a blind spot predicts and recognizes that the driver of the vehicle 10J is sleepy and dangerously drives straight through an intersection, and the information processing apparatus 100 of the vehicle 10A receives the recognition result, the information processing apparatus 100 of the vehicle 10A performs AR display on a notification image 62 that shows a warning regarding the vehicle 10J in the blind spot on the windshield 1401A.

In this way, in the information processing system according to the present embodiment, dangerous driving (sudden cutting in, lane change, sudden braking, excess of speed limit, sudden acceleration, approach of following car, tailgating, drowsy driving, or the like) or accident occurrence is predicted for another vehicle, warning the user vehicle of danger from the other vehicle makes it possible to alert the user (driver). In addition, the warning notification method is not limited to displaying, but warning sound may be emitted from the speaker 1402.

In the fifth embodiment described above, a recognition result is received from another vehicle and a warning is issued, but the present embodiment is not limited thereto. On the basis of an analysis result of a captured image or the like of another vehicle which is taken by the camera provided to the own vehicle, the recognition section 1101 may predict and recognize the dangerous driving of the other vehicle and issue a warning.

3-6. Sixth Embodiment

Next, with reference to FIGS. 28 to 32, an information processing system according to a sixth embodiment will be described. In the sixth embodiment, the case where information of a vehicle is released to others via a network and used will be described.

FIG. 28 is a diagram that describes the overall configuration of the information processing system according to the sixth embodiment. As illustrated in FIG. 28, the information processing system according to the present embodiment includes the roadside wireless communication apparatus 3 that wirelessly communicates with the respective vehicles 10 (specifically, for example, the vehicles 10A to 10E), the management server 4, and a communication terminal 6. The management server 4 transmits, as appropriate, information (which will also be referred to as vehicle information below) acquired from the vehicle 10 via the roadside wireless communication apparatus 3 to the communication terminal 6 via the network 5. As the communication terminal 6, for example, a smartphone 6A, a smart watch 6B, a tablet terminal 6C, a personal computer (PC) 6D, or the like is assumed. With reference to FIGS. 29 to 32, the following describes a vehicle information use method.

Figure 29:
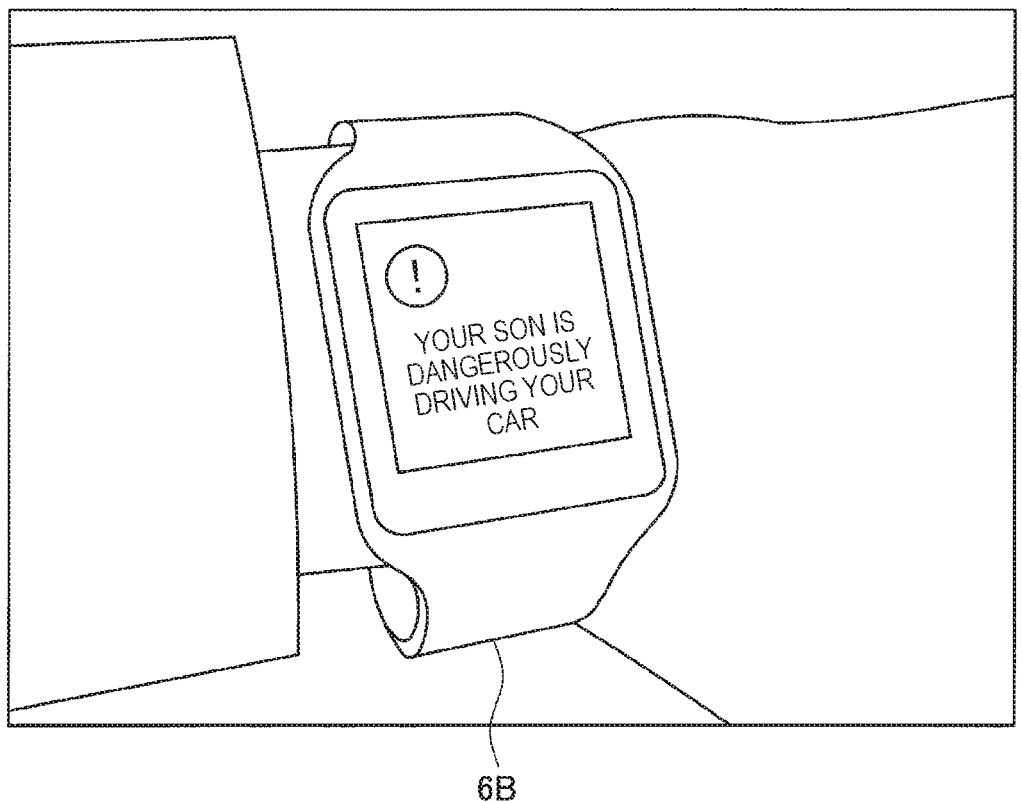
FIG. 29 is a diagram that describes a case where a notification of an important driving situation of a close relative according to the sixth embodiment is issued.

FIG. 29 is a diagram that describes the case where a notification of an important driving situation of a close relative is issued. In the illustrated example, the fact that a son is dangerously driving his parent's car is displayed on the smart watch 6B of his parent. That is, on the basis of a driving content included in vehicle information acquired from the vehicle 10, the management server 4 determines whether or not it is dangerous driving (over-speeding, ignoring a traffic light, weaving, and the like), and notifies a communication terminal of a registered notification destination (parent or owner of automobile) in the case of dangerous driving. Note that the recognition section 1101 of the information processing apparatus 100 mounted on the vehicle is capable of identifying the driver. For example, the driver is identified on the basis of a fingerprint sensor provided to the steering wheel, the recognition of a face image of the driver which is taken by the camera, individual authentication by a communication terminal such as a smartphone possessed by the driver, or the like, and is transmitted to the management server 4 along with the vehicle information.

In this way, for example, in the case where a parent lends his or her car to his or her son or daughter, it is possible to check whether the son or daughter is not dangerously driving. In addition, when the borrower dangerously drives, his or her parent is notified of it. Accordingly, it is possible to expect the borrower to carefully drive.

Figure 30:
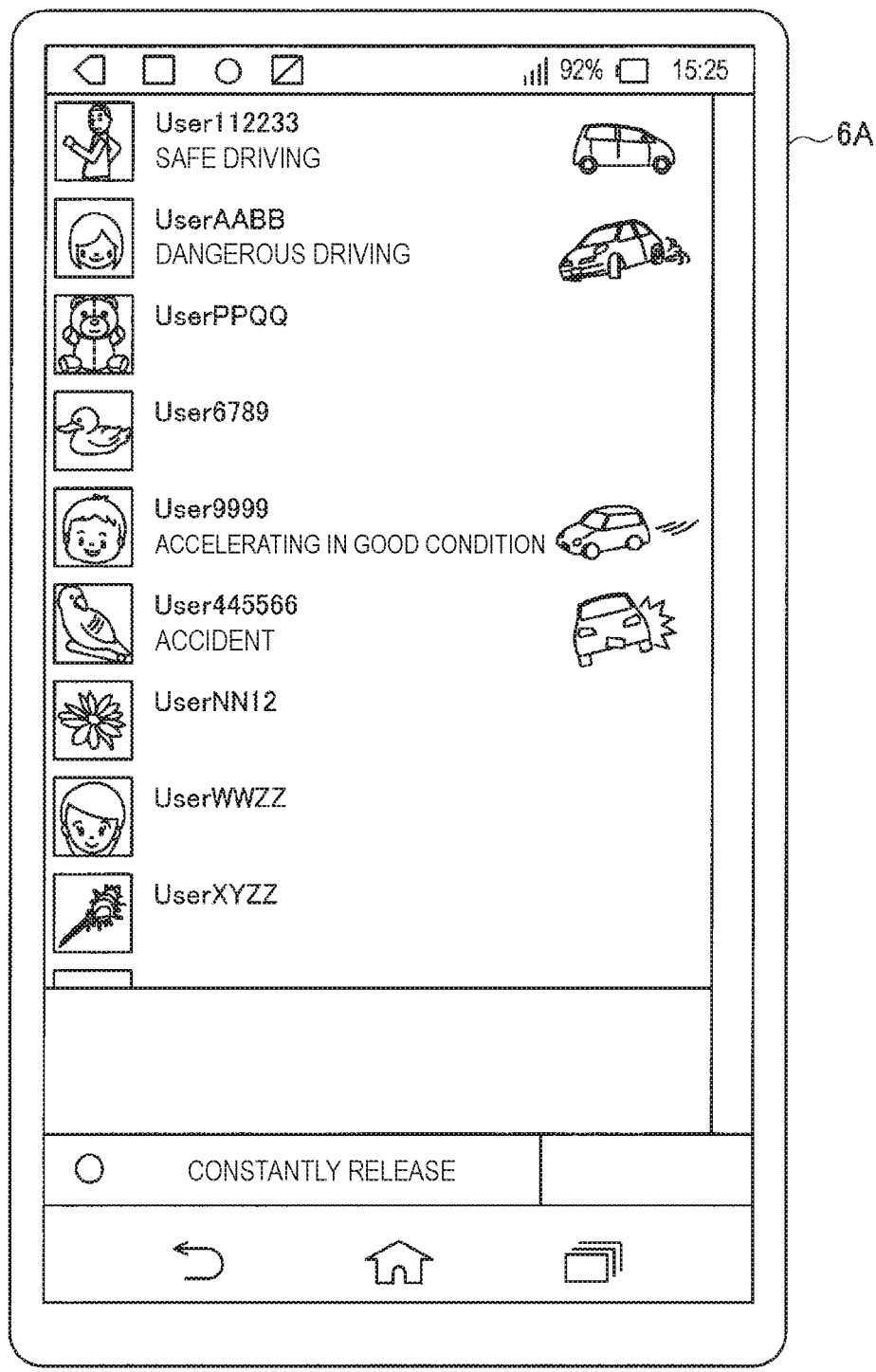
Figure 31:
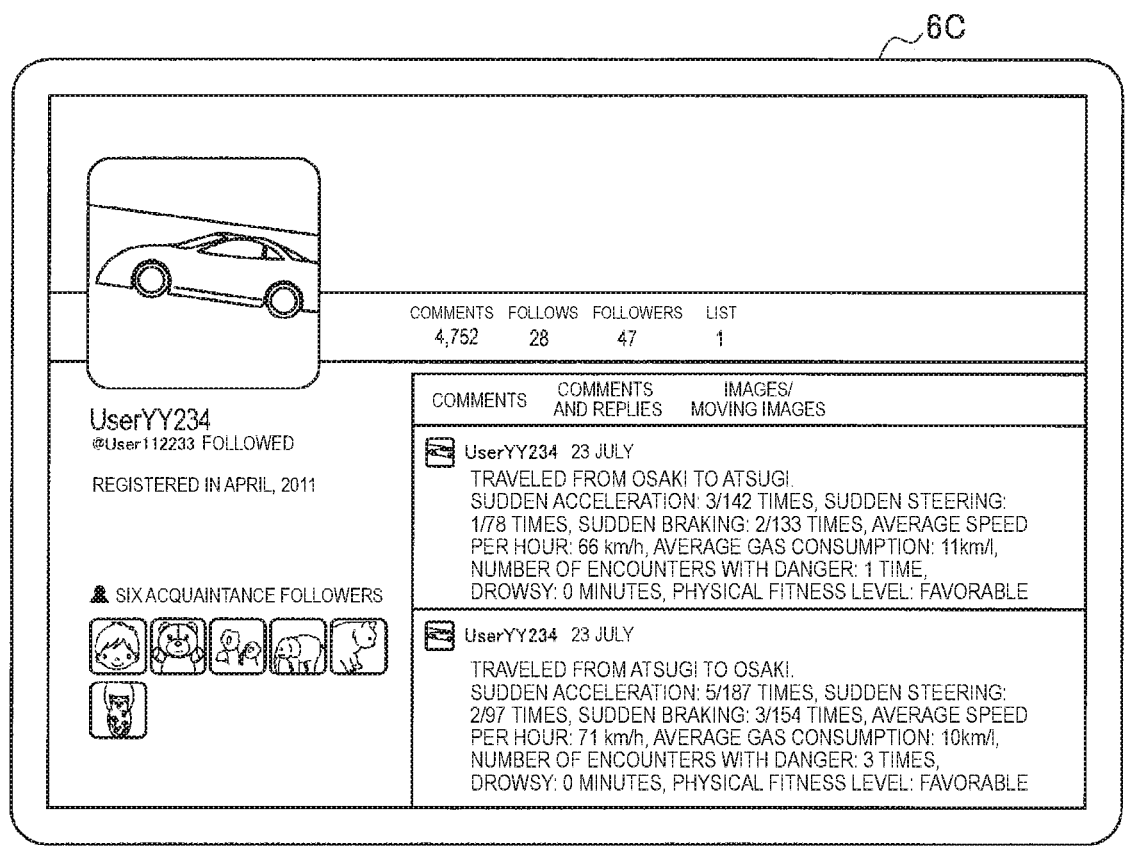

FIGS. 30 and 31 are diagrams each of which describes the case where the driving situation of each user is automatically posted on a social networking service (SNS). For example, in the example illustrated in FIG. 30, the current driving situations of registered friends and acquaintances are posted as needed on the smartphone 6A as one-phrase comments. In addition, icons representing the driving situations can also be displayed. In addition, in the example illustrated in FIG. 31, to the tablet terminal 6C, data (e.g., departure places, destinations, the number of times acceleration is suddenly increased, the number of times the steering wheel is suddenly turned, average speed per hour, average gas consumption, and the like) regarding the current driving situations of registered friends and acquaintances is posted as needed. In any case, it is implemented by the management server 4 posting driving situations included in vehicle information acquired from the vehicle 10 on a registered specific SNS.

In this way, releasing driving situations on an SNS makes it possible to grasp and enjoy each of their driving contents. In addition, the user is expected to drive more carefully because his or her own driving situation is released.

Figure 32:
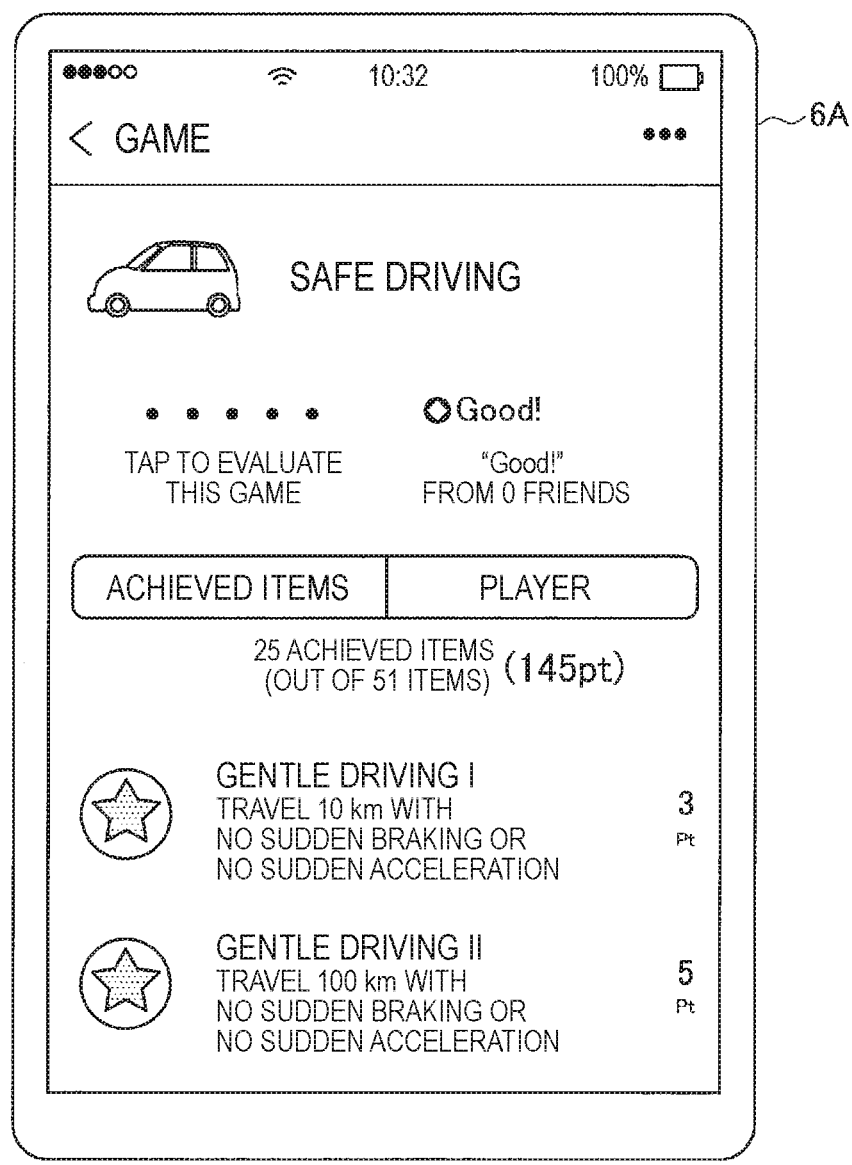
FIG. 32 is a diagram that describes a case where a driving content according to the sixth embodiment is reflected in a game.

FIG. 32 is a diagram that describes the case where a driving content is reflected in a game. In the example illustrated in FIG. 32, on the smartphone 6A, a result obtained by converting driving contents included in vehicle information acquired from a vehicle into scores is displayed. The scores are shared between registered friends and acquaintances, and they compete in scores, thereby making it possible to prompt them to take a safe drive. Driving contents may be converted into scores, for example, by giving scores in accordance with a safe-driving continuing situation ("traveling 10 km with no sudden braking or sudden acceleration," "traveling 100 km with no sudden braking or sudden acceleration," or the like). For example, when the management server 4 acquires vehicle information of a predetermined vehicle that participates in a game, the management server 4 converts the driving contents included in the vehicle information into scores and causes the scores to be shared in a registered group (i.e., between registered friends and acquaintances).

4. SUPPLEMENTAL INFORMATION

Each of the embodiments described above will be supplemented below.

For example, an evaluation in the first embodiment is not limited to an evaluation of an automobile from an automobile or a motorcycle, but may be an evaluation of an automobile/motorcycle from a bicycle or a pedestrian. In addition, evaluation information of a target vehicle may be presented to a bicycle or a pedestrian.

In addition, the information processing system according to the present embodiment may force a vehicle whose evaluation is highly unfavorable (e.g., recognized by a plurality of users to be dangerous) to switch to a self-driving mode and move to a parking lot or the like.

In addition, the information processing system according to the present embodiment may rebate an insurance fee in accordance with the accumulated evaluation information of a driver.

In addition, the information processing system according to the present embodiment may store a captured image obtained by imaging the driving situation of the own vehicle or the circumstances of the surroundings when another vehicle evaluates the own vehicle in association with the evaluation, and enable later reproduction.

In addition, the information processing system according to the present embodiment may verify the consistency of evaluation information for the own vehicle and the driving situation of the own vehicle to prevent fraud evaluations, and refrain from notifying a driver of an evaluation of low reliability. In addition, the information processing system may learn the probability of evaluation administration according to a driving situation from the relationship between a past driving situation and evaluation administration, and refrain from displaying an evaluation made by another vehicle when the administration probability is low.

In addition, the information processing system according to the present embodiment may allow a driver to select the type of evaluation information to be displayed. In addition, the information processing system is also capable of learning feedback yielded by a driver when information that the driver is estimated to want to know is presented, and improving the estimation accuracy.

In addition, the method for displaying accumulated evaluation information of another vehicle is not limited to the example described above, but, for example, the information processing system according to the present embodiment may display the excellency or danger degree of another vehicle which is based on evaluation information with the number of stars, skull marks, or the like. In addition, regarding a vehicle determined to be dangerous, the information processing system according to the present embodiment may explicitly show the driver the reason (weaving driving, sleepy, lower degree of concentration, short inter-vehicle distance, or the like) with text or icons. In addition, evaluation comments of another vehicle to be displayed are not limited to the most recent evaluation comments, but, for example, a plurality of comments may be switched (e.g., in the form of ticker) and displayed one by one.

In addition, the information processing system according to the present embodiment may display the type of actions (direction indicator, hazard, horn, headlight flashing, or the like) of another vehicle as information of the other vehicle as icons or animations. In addition, in the case where the horn is beeped in a remote place, the driver does not know which vehicle beeps the horn. However, the information processing system according to the present embodiment is capable of recognizing the vehicle that beeps the horn by integrating information of another vehicle in its surroundings and presenting it to the driver as a top view screen or the like.

In addition, the information processing system according to the present embodiment may notify the driver of a plurality of types of information by combining the respective embodiments described above. For example, evaluation information and speed information of a vehicle in the vicinity may be displayed together. In addition, information to be displayed may be given priority in accordance with a driving situation or the situation of the surroundings, and information of higher priority may be displayed. For example, information useful to prevent an accident assumed for an intersection is preferentially displayed in an intersection.

5. HARDWARE CONFIGURATION EXAMPLE

The technology according to the present disclosure is applicable to a variety of products. For example, the information processing apparatus 100 may be implemented as an apparatus mounted on any type of vehicle such as an automobile, an electric vehicle, a hybrid electric vehicle, or a motorcycle. In addition, at least some components of the information processing apparatus 100 may be implemented in a module (e.g., integrated circuit module including one die) for an apparatus mounted on a vehicle.

5-1. Configuration Example of Vehicle Control System

Figure 33:
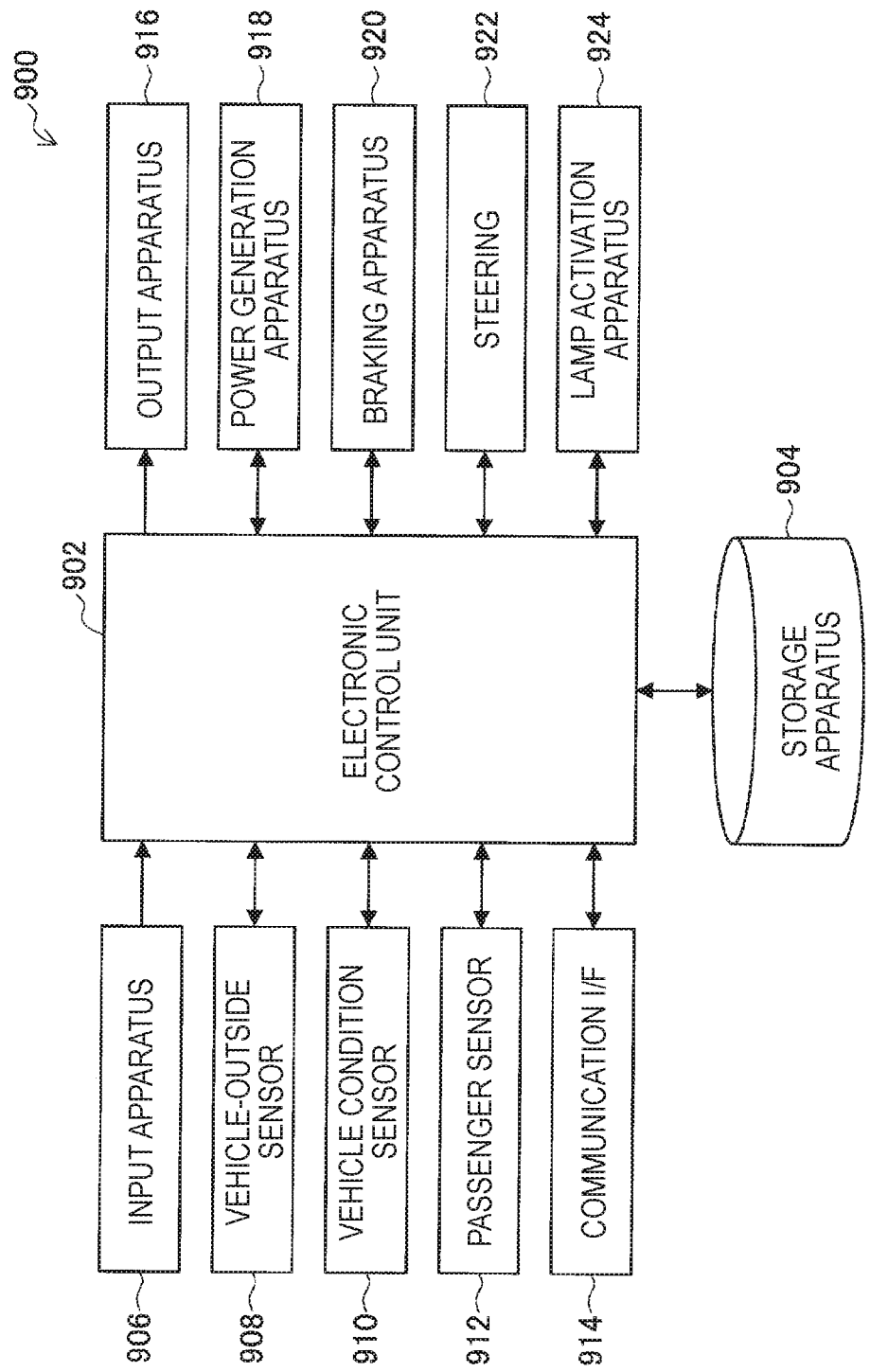
FIG. 33 is a block diagram illustrating an example of a schematic configuration of a vehicle system.

FIG. 33 is a block diagram illustrating an example of the schematic configuration of a vehicle control system 900 to which the technology according to the present disclosure can be applied. The vehicle control system 900 includes an electronic control unit 902, a storage apparatus 904, an input apparatus 906, a vehicle-outside sensor 908, a vehicle condition sensor 910, a passenger sensor 912, a communication IF 914, an output apparatus 916, a power generation apparatus 918, a braking apparatus 920, a steering 922, and a lamp activation apparatus 924.

The electronic control unit 902 functions as an operation processing apparatus and a control apparatus, and controls the overall operation of the vehicle control system 900 in accordance with a variety of programs. The electronic control unit 902 can be configured as an electronic control unit (ECU) along with the storage apparatus 904 described below. A plurality of ECUs (i.e., electronic control unit 902 and storage apparatus 904) may be included in the vehicle control system 900. For example, ECUs for controlling each of various sensors or various drive systems may be provided thereto, and an ECU for controlling the plurality of those ECUs in cooperative manner may be further provided. The plurality of these ECUs are connected via an in-vehicle communication network such as a controller area network (CAN), a local interconnect network (LIN), a local area network (LAN), or Flexray that is compliant with any standard. The electronic control unit 902 can be included, for example, in the control section 110 illustrated in FIG. 2.

The storage apparatus 904 is an apparatus for data storage which is configured as an example of a storage section of the vehicle control system 900. The storage apparatus 904 is implemented, for example, by a magnetic storage device such as a HDD, a semiconductor storage device, an optical storage device, a magneto-optical storage device, or the like. The storage apparatus 904 may include a recording medium, a recording apparatus that records data in the recording medium, a readout apparatus that reads out data from the recording medium, and a deletion apparatus that deletes data recorded in the recording medium. This storage apparatus 904 stores a program to be executed by the electronic control unit 902, various types of data, various types of data acquired from the outside, and the like. The storage apparatus 904 can be included, for example, in the storage section 150 illustrated in FIG. 2.

The input apparatus 906 is implemented, for example, by an apparatus such as a mouse, a keyboard, a touch panel, a button, a microphone, a switch, and a lever into which a passenger (driver or occupant) inputs information. In addition, the input apparatus 906 may be, for example, a remote control apparatus using infrared light or other radio waves, or may be an external connection device such as a mobile phone or a PDA corresponding to the operation of the vehicle control system 900. In addition, the input apparatus 906 may be, for example, a camera. In that case, a passenger can input information according to gesture. Further, the input apparatus 906 may include an input control circuit or the like that generates an input signal, for example, on the basis of information input by a user using the above-described input means, and outputs the generated input signal to the electronic control unit 902. The passenger is able to input various kinds of data to the vehicle control system 900 or instruct the vehicle control system 900 about a processing operation by operating this input apparatus 906. The input device 906 can be included, for example, in the input section 130 illustrated in FIG. 2.

The vehicle-outside sensor 908 is implemented by a sensor that detects information of the outside of the vehicle. For example, the vehicle-outside sensor 908 may include a sonar apparatus, a radar apparatus, a light detection and ranging or laser imaging detection and ranging (LIDAR) apparatus, a camera, a stereo-camera, a time of flight (ToF) camera, an infrared sensor, an environment sensor, a microphone, or the like. The vehicle-outside sensor 908 can be included, for example, in the sensor 1302 illustrated in FIG. 3.

The vehicle condition sensor 910 is implemented by a sensor that detects information regarding the vehicle condition. For example, the vehicle condition sensor 910 may include a sensor that detects an operation performed by a driver such as an accelerator opening degree, brake stepping force, or a steering wheel angle. In addition, the vehicle condition sensor 910 may include a sensor that detects the condition of a power source such as the rotation speed or torque of an internal combustion engine or a motor. In addition, the vehicle condition sensor 910 may include a sensor such as a gyro sensor or an acceleration sensor for detecting information regarding the movement of the vehicle. In addition, the vehicle condition sensor 910 may include a global navigation satellite system (GNSS) module that receives GNSS signals (e.g., global positioning system (GPS) signals from a GPS satellite) from a GNSS satellite, and measures position information including the latitude, longitude, and altitude of the apparatus. Note that, with respect to the position information, the vehicle condition sensor 910 may sense the position through Wi-Fi (registered trademark), transmission and reception to and from a mobile phone/PHS/smartphone or the like, near field communication, or the like. The vehicle condition sensor 910 can be included, for example, in the onboard apparatus 1301 illustrated in FIG. 3.

The passenger sensor 912 can be implemented by a sensor that detects information regarding a passenger. For example, the passenger sensor 912 may include a camera, a microphone, and an environment sensor provided to a vehicle compartment. In addition, the passenger sensor 912 may include a biological sensor that detects biological information of a passenger. The biological sensor is attached, for example, to a seating face, the steering wheel, or the like, and is capable of detecting biological information of the passenger sitting on the seat or the driver gripping the steering. The passenger sensor 912 can be included, for example, in the sensor 1302 illustrated in FIG. 3.

Note that various sensors such as the vehicle-outside sensor 908, the vehicle condition sensor 910, and the passenger sensor 912 each output information showing a detection result to the electronic control unit 902. These various sensors may set the sensing area, accuracy, or the like on the basis of the control of the electronic control unit 902. In addition, these various sensors may include a recognition module that performs recognition processing based on raw data such as processing of recognizing the driving position of an own vehicle on a road, for example, on the basis of the position of a lane line included in a taken captured image.

The communication IF 914 is a communication interface that mediates communication performed by the vehicle control system 900 with another apparatus. The communication IF 914 can include, for example, a V2X communication module. Note that V2X communication is a concept including vehicle-to-vehicle communication and vehicle-to-infrastructure communication. Additionally, the communication IF 914 may also include a communication module for a wireless local area network (LAN), Wi-Fi (registered trademark), 3G, long term evolution (LTE), Bluetooth (registered trademark), near field communication (NFC) or wireless USB (WUSB). This communication IF 914 is capable of transmitting and receiving signals or the like, for example, to and from the Internet or other communication devices outside the vehicle in compliance with a predetermined protocol such as TCP/IP. The communication IF 914 can be included, for example, in the communication section 120 illustrated in FIG. 2.

The output apparatus 916 is implemented as an apparatus capable of visually or aurally notifying a passenger of acquired information. Such an apparatus includes a display apparatus such as an instrument panel, a head-up display, a projector or a lamp, and a sound output apparatus such as a speaker or headphones. Specifically, the display apparatus visually displays results obtained from various kinds of processing performed by the vehicle control system 900 in a variety of forms such as text, an image, a table, and a graph. At that time, a virtual object such as an augmented reality (AR) object may be displayed. Meanwhile, the sound output apparatus converts audio signals including reproduced sound data, acoustic data, or the like into analog signals, and aurally outputs the analog signals. The above-described display apparatus and the above-described sound output apparatus can be included, for example, in the output section 140 illustrated in FIG. 2.

The power generation apparatus 918 is an apparatus for generating driving force for the vehicle. The power generation apparatus 918 may be implemented, for example, by an internal combustion engine. In that case, the power generation apparatus 918 performs start control, stop control, throttle valve opening degree control, fuel injection control, exhaust gas recirculation (EGR) control, or the like on the basis of a control command from an electronic control unit 902. In addition, the power generation apparatus 918 may be implemented, for example, as a motor, an inverter, and a battery. In that case, the power generation apparatus 918 can supply electric power from the battery to the motor via the inverter on the basis of a control command from the electronic control unit 902, and perform a motor operation (so-called powering) to output positive torque and a regenerative operation to cause the motor to absorb torque to generate electric power, and charge the battery.

The braking apparatus 920 is an apparatus for providing braking force to the vehicle, or causing the vehicle to decelerate or stop. The braking apparatus 920 can include, for example, a brake installed at each wheel, and a brake pipe for transmitting the force of stepping on the brake pedal to the brake, an electronic circuit or the like. In addition, the braking apparatus 920 may include a control apparatus such as an antilock brake system (ABS) or an electronic stability control (ESC) for activating a mechanism of preventing a slide or a skid caused by brake control.

The steering 922 is an apparatus for controlling the advancing direction (steering angle) of the vehicle. The steering 922 can include, for example, a steering wheel, a steering shaft, a steering gear, a tie rod, and the like. In addition, the steering 922 can include a power steering for assisting a driver in steering. Further, the steering 922 can include a power source such as a motor for allowing for automatic steering.

The lamp activation apparatus 924 is an apparatus that activates various lamps such as a head light, a turn signal, a position lamp, a fog light, or a stop lamp. The lamp activation apparatus 924 controls, for example, the blinking of the lamps, the amount of light, the light-emitting direction, or the like.

Note that the power generation apparatus 918, the braking apparatus 920, the steering 922, and the lamp activation apparatus 924 may come into operation on the basis of a manual operation performed by a driver or on the basis of an automatic operation performed by the electronic control unit 902.

5-2. Configuration Example of Information Processing Apparatus

Figure 34:
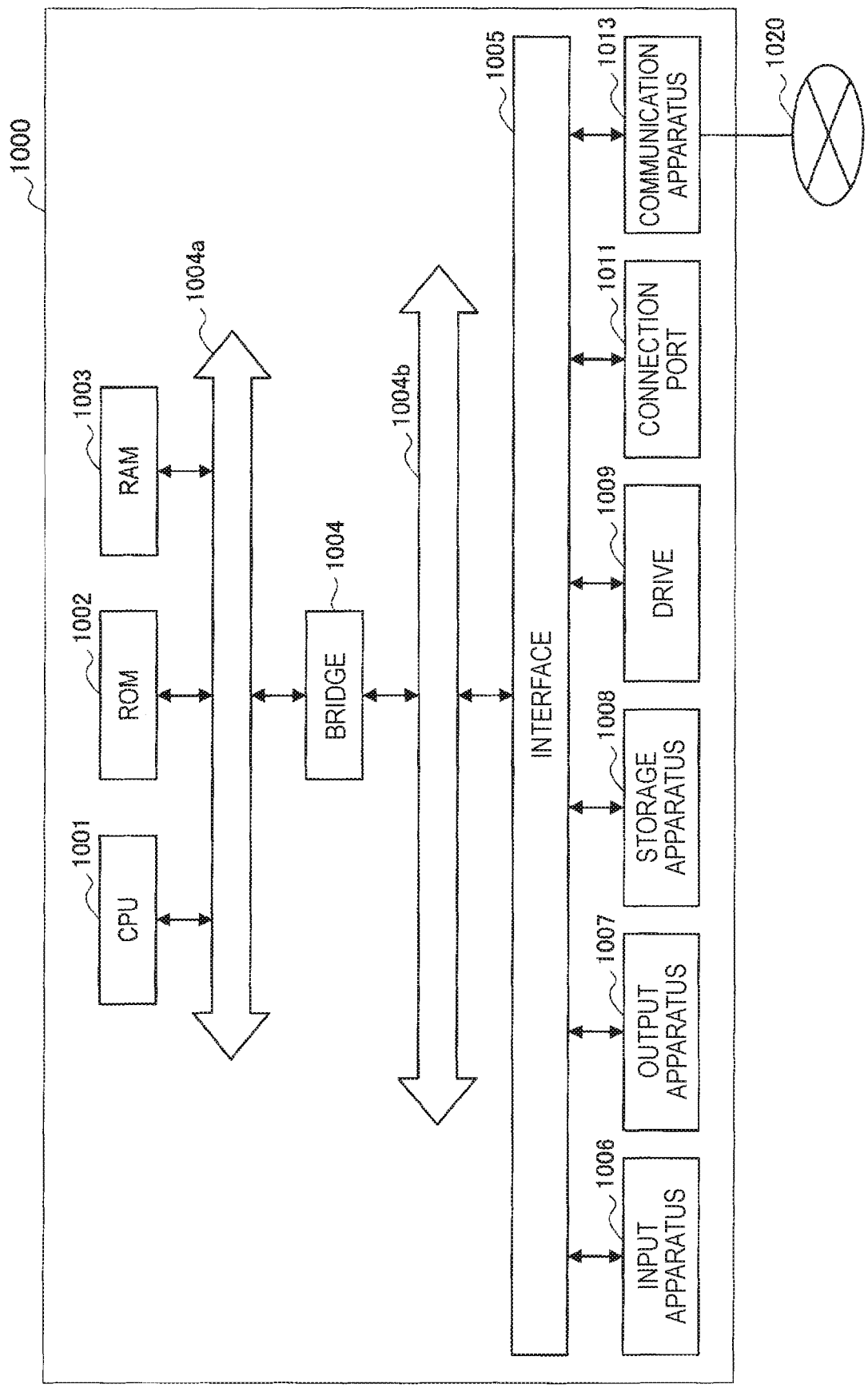
FIG. 34 is a block diagram illustrating an example of a hardware configuration of an information processing apparatus.

FIG. 34 is a block diagram illustrating an example of the hardware configuration of an information processing apparatus according to the present embodiment. Note that an information processing apparatus 1000 illustrated in FIG. 34 can implement, for example, the management server 4 illustrated in FIG. 28. Information processing performed by a management server 28 according to the present embodiment is implemented by software in cooperation with hardware described below.

As illustrated in FIG. 34, the information processing apparatus 1000 includes a central processing unit (CPU) 1001, a read only memory (ROM) 1002, a random access memory (RAM) 1003, and a host bus 1004a. In addition, the information processing apparatus 1000 includes a bridge 1004, an external bus 1004b, an interface 1005, an input apparatus 1006, an output apparatus 1007, a storage apparatus 1008, a drive 1009, a connection port 1011, and a communication apparatus 1013. The information processing apparatus 1000 may include a processing circuit such as a DSP or an ASIC instead of or in combination with the CPU 1001.

The CPU 1001 functions as an operation processing apparatus and a control apparatus, and controls the overall operation of the information processing apparatus 1000 in accordance with a variety of programs. In addition, the CPU 1001 may be a microprocessor. The ROM 1002 stores programs, operation parameters, and the like that the CPU 1001 uses. The RAM 1003 temporarily stores programs used in the execution of the CPU 1001 and the parameters and the like that appropriately changes during the execution.

The CPU 1001, the ROM 1002, and the RAM 1003 are connected to each other by the host bus 1004a including a CPU bus and the like. The host bus 1004a is connected to the external bus 1004b such as a peripheral component interconnect/interface (PCI) bus through the bridge 1004. Note that, the host bus 1004a, the bridge 1004, and the external bus 1004b are not necessarily configured as different components, but the functions thereof may be implemented in one bus.

The input apparatus 1006 is implemented by an apparatus with which a user inputs information, such as a mouse, a keyboard, a touch panel, a button, a microphone, a switch, and a lever. In addition, the input apparatus 1006 may be, for example, a remote control apparatus using infrared light or other radio waves, or may be an external connection device such as a mobile phone or a PDA corresponding to the operation of the information processing apparatus 1000. Further, the input apparatus 1006 may include, for example, an input control circuit or the like that generates an input signal on the basis of information input by a user using the above-described input means, and outputs the input signal to the CPU 1001. A user of the information processing apparatus 1000 is able to input various kinds of data to the information processing apparatus 1000 and instruct the information processing apparatus 1000 about a processing operation by operating this input apparatus 1006.

The output apparatus 1007 includes an apparatus capable of visually or aurally notifying a user of acquired information. Such an apparatus includes a display apparatus such as a CRT display apparatus, a liquid crystal display apparatus, a plasma display apparatus, an EL display apparatus, a laser projector, an LED projector and a lamp, an audio output apparatus such as a speaker and a headphone, a printer apparatus, or the like. The output apparatus 1007 outputs, for example, results obtained from various kinds of processing performed by the information processing apparatus 1000. Specifically, the display apparatus visually displays results obtained from various kinds of processing performed by the information processing apparatus 1000 in a variety of forms such as text, an image, a table, and a graph. Meanwhile, the audio output apparatus converts audio signals including reproduced sound data, acoustic data, or the like into analog signals, and aurally outputs the analog signals.

The storage apparatus 1008 is an apparatus for data storage which is configured as an example of a storage section of the information processing apparatus 1000. The storage apparatus 1008 is implemented, for example, as a magnetic storage device such as a HDD, a semiconductor storage device, an optical storage device, a magneto-optical storage device, or the like. The storage apparatus 1008 may include a recording medium, a recording apparatus that records data in the recording medium, a readout apparatus that reads out data from the recording medium, and a deletion apparatus that deletes data recorded in the recording medium. The storage apparatus 1008 stores a program to be executed by the CPU 1001, various kinds of data, various kinds of data acquired from the outside, and the like.

The drive 1009 is a reader/writer for a storage medium, and is built in or externally attached to the information processing apparatus 1000. The drive 1009 reads out information recorded on a removable storage medium such as a mounted magnetic disk, an optical disc, a magneto-optical disk, and semiconductor memory, and outputs the read-out information to the RAM 1003. In addition, the drive 1009 is also capable of writing information into a removable storage medium.

The connection port 1011 is an interface connected to an external device and is a port for connecting an external device that is capable of data transmission through, for example, a universal serial bus (USB).

The communication apparatus 1013 is, for example, a communication interface including a communication device and the like for a connection to a network 1020. The communication apparatus 1013 may be, for example, a communication card for a wired or wireless local area network (LAN), Long Term Evolution (LTE), Bluetooth (registered trademark), a wireless USB (WUSB), or the like. In addition, the communication apparatus 1013 may be a router for optical communication, a router for an asymmetric digital subscriber line (ADSL), a modem for various kinds of communication, or the like. This communication apparatus 1013 is capable of transmitting and receiving signals or the like, for example, to and from the Internet or other communication devices in compliance with a predetermined protocol such as TCP/IP.

Note that, the network 1020 is a wired or wireless transmission path through which information is transmitted from an apparatus connected to the network 1020. The network 1020 may include public networks such as the Internet, telephone networks and satellite networks, a variety of local area networks (LANs) including Ethernet (registered trademark), and wide area networks (WANs). In addition, the network 1020 may also include leased line networks such as Internet protocol-virtual private networks (IP-VPNs).

5-3. Others

The above shows an example of the hardware configuration capable of implementing the functions of the information processing apparatus 100 or the management server 28 according to the present embodiment. Each of the above-described components may be configured with a general-purpose member, and may also be configured with hardware specialized in the function of each component. Thus, the hardware configuration used can be modified as appropriate in accordance with the technological level at the time of the implementation of the present embodiment.

Note that it is possible to create a computer program for implementing the respective functions of the information processing apparatus 100 or the management server 28 according to the present embodiment as described above, and to implement the computer program in an ECU or the like. In addition, there can also be provided a computer-readable recording medium having such a computer program stored therein. Examples of the recording medium include a magnetic disk, an optical disc, a magneto-optical disk, a flash memory, and the like. In addition, the computer program may also be distributed via a network, for example, using no recording medium.

6. CONCLUSION

The above describes an embodiment of the present disclosure in detail with reference to FIGS. 1 to 34. As described above, in the information processing system according to an embodiment of the present disclosure, it is possible to efficiently use information regarding a user evaluation of a target vehicle.

That is, releasing evaluation information of the own vehicle to another vehicle offers an expected effect sufficient to motivate the driver to be a good driver who is not motivated sufficiently just by grasping an evaluation of the driver himself or herself. In addition, knowing evaluation information of another vehicle makes it possible to prevent an accident or take a comfortable drive.

In addition, in the information processing system according to an embodiment of the present disclosure, information of another vehicle is not limited to evaluation information, but it is also possible to acquire the profile of a vehicle, the profile of a driver, and the like such as speed information, acceleration and deceleration information, recognition information, a behavior prediction recognition result, a departure place/destination and automobile insurance purchase information, and present them to a user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing the hardware such as the CPU, the ROM, and the RAM built in the above-described information processing apparatus 100 or management server 4 to perform the functions of the information processing apparatus 100 or the management server 4. In addition, there is also provided a computer-readable storage medium having the computer program stored therein.

In addition, a part of the functions of the control section 110 of the information processing apparatus 100 illustrated in FIG. 2 may be on the management server 4 side.

In addition, the configuration of the information processing apparatus 100 illustrated in FIGS. 2 and 3 is an example. The present embodiment is not limited thereto. For example, in the case where the information processing apparatus 100 is implemented by a smartphone, a tablet terminal, or the like, the onboard apparatus 1301, the sensor 1302, the operation input section 1303, the microphone 1304, the display section 1401, the speaker 1402, and the communication section 120 among the components illustrated in FIG. 3 are provided onto the vehicle side. In this case, the information processing apparatus 100 acquires and processes various kinds of information from the onboard apparatus 1301, the sensor 1302, the operation input section 1303 and the microphone 1304 provided onto the vehicle side, and performs control such that a user is notified from the display section 1401 or the speaker 1402 provided onto the vehicle side, or data is transmitted and received between the communication section 120 provided onto the vehicle side and the outside.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a recognition section configured to automatically recognize information of a target vehicle from environment information of a user;

an acquisition section configured to acquire a user evaluation of the recognized target vehicle; and a generation section configured to generate information for issuing a notification of the acquired user evaluation.

(2)

The information processing apparatus according to (1), in which the recognition section recognizes the target vehicle on a basis of information from a sensor provided to a user vehicle, and the information processing apparatus further includes an another-user evaluation acquisition section configured to acquire information regarding an evaluation made by another user regarding the target vehicle recognized by the recognition section, and a notification control section configured to perform control such that a user is notified of the acquired predetermined information in a user vehicle.

(3)

The information processing apparatus according to (2), in which the another-user evaluation acquisition section acquires information received from the target vehicle through vehicle-to-vehicle communication.

(4)

The information processing apparatus according to (2) or (3), in which at least one of an evaluator, an evaluatee, and a third party in a vicinity is notified of the information generated by the generation section.

(5)

The information processing apparatus according to any one of (2) to (4), in which the recognition section automatically recognizes a target vehicle that is a user evaluation target on a basis of gaze information, surrounding information, a positional relationship between a user vehicle and a vehicle in a surrounding, a user's degree of concentration, a traveling situation of a user vehicle, or a speech content of the user included in environment information of the user.

(6)

The information processing apparatus according to any one of (2) to (5), in which the acquisition section acquires a user evaluation based on an operation input, a sound input, or a driving operation made by a user.

(7)

The information processing apparatus according to any one of (2) to (6), in which the notification control section performs control such that a notification is issued from a display apparatus that is visually recognizable to a user or a sound output apparatus, the display apparatus and the sound output apparatus being provided in a vehicle.

(8)

The information processing apparatus according to any one of (2) to (7), further including:

an estimation section configured to estimate of what information regarding the recognized target vehicle a driver is currently to be notified; and an acquisition control section configured to perform control such that the information estimated by the estimation section is acquired from the target vehicle.

(9)

The information processing apparatus according to (8), in which the information to be acquired from the target vehicle is at least one of information regarding an evaluation of the target vehicle from another user, speed information of the target vehicle, acceleration and deceleration information of the target vehicle, recognition information of a user vehicle in the target vehicle, and a drive prediction recognition result and a profile of the target vehicle.

(10)

The information processing apparatus according to (8), in which the notification control section performs display control such that the information acquired from the target vehicle is visually recognized on a display apparatus visually recognizable to a user in association with the target vehicle, the display apparatus being provided in a vehicle.

(11)

The information processing apparatus according to (9) or (10), in which the notification control section performs control on a basis of the information acquired from the target vehicle such that a user is warned.

(12)

The information processing apparatus according to any one of (9) to (11), in which the notification control section performs control on a basis of the information acquired from the target vehicle such that a notification of a drive prediction result of a user vehicle is issued.

(13)

The information processing apparatus according to any one of (2) to (12), in which the notification control section performs control such that a user is notified in real time of a content of an evaluation made for the target vehicle, a content of an evaluation made by another user for a user vehicle, or a content of an evaluation made by another user for another vehicle.

(14)

The information processing apparatus according to any one of (2) to (13), further including:

a transmission control section configured to perform control such that a driving situation of a user vehicle is transmitted to a server on a network.

(15)

The information processing apparatus according to (2), in which the acquisition section acquires a user evaluation made by a pedestrian or a bicycle rider for a target vehicle.

(16)

The information processing apparatus according to any one of (2) to (15), in which the generation section generates information for issuing a notification on a basis of at least one of information regarding the target vehicle or environment information of a user, the notification requiring the user to make an evaluation.

(17)

The information processing apparatus according to any one of (2) to (16), in which the generation section generates a reason for the user evaluation on a basis of at least one of information regarding the target vehicle or environment information of a user.

(18)

An information processing method including, by a processor:

automatically recognizing information of a target vehicle from environment information of a user;

acquiring a user evaluation of the recognized target vehicle; and generating information for issuing a notification of the acquired user evaluation.

(19)

A program for causing a computer to function as:

a recognition section configured to automatically recognize information of a target vehicle from environment information of a user;

an acquisition section configured to acquire a user evaluation of the recognized target vehicle; and a generation section configured to generate information for issuing a notification of the acquired user evaluation.

REFERENCE SIGNS LIST

100 information processing apparatus
110 control section
1101 recognition section
1102 user evaluation acquisition section
1103 notification information generation section
1104 notification control section
120 communication section
1201 vehicle-to-vehicle communication section
1202 road-to-vehicle communication section
1203 network I/F section 130 input section
1301 onboard apparatus
1302 sensor
1303 operation input section
1304 microphone
140 output section
1401 display section
1402 speaker
150 storage section
10 vehicle
4 management server

The invention claimed is:

1. An information processing apparatus, comprising:
circuitry configured to
recognize a target vehicle based on environment information;
acquire a user evaluation for the recognized target vehicle;
estimate, using machine learning, type of notification information;
generate the notification information for notifying the acquired user evaluation; and
perform control to notify the generated notification information.

2. The information processing apparatus according to claim 1, wherein
the circuitry acquires information from the target vehicle through vehicle-to-vehicle communication.

3. The information processing apparatus according to claim 1, wherein
at least one of an evaluator, an evaluatee, and a third party within a predetermined distance from the information processing apparatus is notified of the generated notification information.

4. The information processing apparatus according to claim 1, wherein
the circuitry recognizes the target vehicle that is an evaluation target on a basis of gaze information, surrounding information, positional information, a degree of concentration, a traveling situation, or a speech content, included in the environment information.

5. The information processing apparatus according to claim 1, wherein
the circuitry acquires the user evaluation based on an operation input, a sound input, or a driving operation.

6. The information processing apparatus according to claim 1, wherein
the circuitry performs control on a display apparatus or a sound output apparatus to notify the generated notification information.

7. The information processing apparatus according to claim 1, wherein
the estimated notification information is at least one of an evaluation of the target vehicle from another user, speed information of the target vehicle, acceleration and deceleration information of the target vehicle, recognition information, and a drive prediction result and a profile of the target vehicle.

8. The information processing apparatus according to claim 1, wherein
the circuitry controls a display to visually display the estimated notification information in association with the target vehicle.

9. The information processing apparatus according to claim 7, wherein
the circuitry performs control on a basis of the information acquired from the target vehicle such that the user is warned.

10. The information processing apparatus according to claim 7, wherein
the circuitry performs control on a basis of the information acquired from the target vehicle such that a notification of a drive prediction is output.

11. The information processing apparatus according to claim 1, wherein
the circuitry performs control such that the user is notified in real time of a content of an evaluation made for the target vehicle, a content of an evaluation made by another user for the user vehicle, or a content of an evaluation made by another user for another vehicle.

12. The information processing apparatus according to claim 1, wherein the circuitry is further configured to perform control such that a driving situation of a user vehicle is transmitted to a server on a network.

13. The information processing apparatus according to claim 1, wherein
the circuitry acquires the user evaluation made by a pedestrian or a bicycle rider for the target vehicle.

14. The information processing apparatus according to claim 1, wherein
the circuitry generates information for issuing the notification on a basis of at least one of information regarding the target vehicle or the environment information, the notification requiring the user to make an evaluation.

15. The information processing apparatus according to claim 1, wherein
the circuitry generates a reason for the user evaluation on a basis of at least one of information regarding the target vehicle or the environment information.

16. An information processing method for an information processing apparatus, comprising:
recognizing, using circuitry, a target vehicle based on environment information;
acquiring a user evaluation for the recognized target vehicle;
estimating, using machine learning, type of notification information;
generating the notification information for notifying the acquired user evaluation; and
performing control to notify the generated notification information.

17. A non-transitory computer readable medium including executable instructions, which when executed by a computer cause the computer to execute an information processing method for an information processing apparatus, the method comprising:
recognizing a target vehicle based on environment information;
acquiring a user evaluation for the recognized target vehicle;
estimating, using machine learning, type of notification information;
generating the notification information for notifying the acquired user evaluation; and
performing control to notify the generated notification information.

18. An information processing apparatus, comprising:
circuitry configured to
    recognize a target vehicle, using machine learning, based on environment information;
    acquire a user evaluation made by a pedestrian or a bicycle rider for the recognized target vehicle;
    generate notification information for notifying the acquired user evaluation; and
    perform control to notify the generated notification information.

* * * * *